United States Patent
Bennett-James et al.

(10) Patent No.: US 12,382,115 B2
(45) Date of Patent: *Aug. 5, 2025

(54) MACHINE LEARNING BASED MEDIA CONTENT ANNOTATION

(71) Applicant: NAGRAVISION SARL, Cheseaux-sur-Lausanne (CH)

(72) Inventors: Jonathan Bennett-James, Wales (GB); Craig Holbrook, Wales (GB)

(73) Assignee: NAGRAVISION SARL, Cheseaux-sur-Lausanne (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/618,080

(22) Filed: Mar. 27, 2024

(65) Prior Publication Data

US 2024/0314372 A1   Sep. 19, 2024

Related U.S. Application Data

(63) Continuation of application No. 17/510,722, filed on Oct. 26, 2021, now Pat. No. 11,973,993.

(60) Provisional application No. 63/106,784, filed on Oct. 28, 2020.

(51) Int. Cl.
*H04N 21/235* (2011.01)
*G06N 20/00* (2019.01)
*G06V 20/40* (2022.01)
*H04N 21/266* (2011.01)

(52) U.S. Cl.
CPC ......... *H04N 21/2353* (2013.01); *G06N 20/00* (2019.01); *G06V 20/47* (2022.01); *H04N 21/26603* (2013.01)

(58) Field of Classification Search
None
See application file for complete search history.

(56) References Cited

U.S. PATENT DOCUMENTS

| | | | |
|---|---|---|---|
| 11,151,386 B1 * | 10/2021 | Aggarwal | H04N 21/84 |
| 2018/0277093 A1 * | 9/2018 | Carr | G06F 3/011 |
| 2021/0117685 A1 * | 4/2021 | Sureshkumar | H04N 21/44016 |
| 2021/0151038 A1 * | 5/2021 | Manjunath | G10L 15/1815 |

* cited by examiner

*Primary Examiner* — Omar S Parra
(74) *Attorney, Agent, or Firm* — POLSINELLI LLP

(57) ABSTRACT

Systems and techniques are described herein for annotating media content. For example, a process can include obtaining media content and generate, use one or more machine learning models, a metadata file for at least a portion of the media content. The metadata file includes one or more metadata descriptions. The process can include generating a text description of the media content based on the one or more metadata descriptions of the metadata file. The process can include annotating the media content use the text description.

19 Claims, 12 Drawing Sheets

| | | |
|---|---|---|
| Simple | PERSON a DESCRIPTION1, wearing a DESCRIPTION2 and EXPRESSION is ACTION with a OBJECT<br><br>Boris Johnson a male of approx 35-54 years old, wearing a tie and not smiling is sitting with a table | Highest Confidence |
| Simple | PERSON a DESCRIPTION1, wearing a DESCRIPTION2 and EXPRESSION is ACTION with a OBJECT<br><br>Boris Johnson a male of approx 35-54 years old, wearing a overcoat, suit and not smiling is sitting with a table | Highest Confidence-1 |
| Compound | PERSON a DESCRIPTION1, wearing a DESCRIPTION2 and EXPRESSION is ACTION with a OBJECT and appears to have EMOTION1 emotion while talking about SUBJECT<br><br>Boris Johnson a male of approx 35-54 years old, wearing a tie and not smiling is sitting with a table and appear to have mixed emotion while talking about the disease | Highest Confidence |
| Compound | PERSON a DESCRIPTION1, wearing a DESCRIPTION2 and EXPRESSION is ACTION with a OBJECT and appears to have EMOTION1 emotion while talking about SUBJECT<br><br>Boris Johnson a male of approx 35-54 years old, wearing a overcoat, suit and not smiling is sitting with a table and appear to have positive emotion while talking about the number | Highest Confidence-1 |
| Complex | PERSON a DESCRIPTION1, wearing a DESCRIPTION2 and EXPRESSION is ACTION with a OBJECT and appears to be EMOTION1 although while ACTION, SUBJECT, PERSON also appears to be Emotion n-1 and Emotion n-2<br><br>Boris Johnson a male of approx 35-54 years old, wearing a tie and not smiling is sitting at a table and appears to be mixed although while sitting the disease Boris Johnson also appears to be positive and neutral | Highest Confidence |
| Complex 2 | PERSON a DESCRIPTION1, wearing a DESCRIPTION2 and EXPRESSION is ACTION with a OBJECT and appears to be EMOTION1 although while ACTION, SUBJECT, PERSON also appears to be Emotion n-1 and Emotion n-2<br><br>Boris Johnson a male of approx 35-54 years old, wearing a overcoat suit and not smiling is sitting at a table and appears to be positive although while sitting the number Boris Johnson also appears to be positive and neutral | Highest Confidence-1 |

MACHINE LEARNING BASED MEDIA CONTENT ANNOTATION

CROSS REFERENCE TO RELATED APPLICATIONS FILED

This application is a continuation of U.S. patent application Ser. No. 17/510,722 filed Oct. 26, 2021, which claims the benefit to U.S. Provisional Patent Application No. 63/106,784 filed Oct. 28, 2020, the entire contents of each which are incorporated herein by reference in their entirety for all purposes.

FIELD

The present disclosure generally relates to processing of media content. Some aspects described herein are related to machine learning based annotation of media content.

BACKGROUND

Media capture devices can capture various types of media content, including images, video, and/or audio. For example, a camera can capture image data or video data of a scene. The media data from a media capture device can be captured and output for processing and/or consumption. For instance, a video of a scene can be captured and processed for display on one or more viewing devices. In some cases, media content can be annotated using additional content. Examples of annotated media content include media clips summarizing an item of media content (e.g., a movie, a show, a song), audio descriptions of media content, among others.

In some cases, challenges arise when generating additional content for annotating media content. In some examples, generating media summaries, audio descriptions, or other additional content can be a time-consuming and expensive process. For instance, an automated process can have difficulties in selecting appropriate audio content (e.g., particular sentences to use, objects to describe, etc.) to use for an audio description or other additional content. In another example, capturing and selecting relevant media segments at different points in a video can also be difficult. Such difficulties are exacerbated when a large volume of media content is available for processing. Systems and techniques are needed for generating additional or annotated media content that overcome such challenges.

SUMMARY

Techniques and systems are described herein for annotating media content using metadata generated using one or more machine learning models. According to at least one example, a process or method includes: obtaining media content; generating, using one or more machine learning models, a metadata file for at least a portion of the media content, the metadata file including one or more metadata descriptions; generating a text description of the media content based on the one or more metadata descriptions of the metadata file; and annotating the media content using the text description.

In another example, a system or device for annotating media content is provided that includes storage (e.g., a memory configured to store data, such as media data, one or more images, etc.) and one or more processors (e.g., implemented in circuitry) coupled to the memory. The one or more processors are configured to: obtain media content; generate, using one or more machine learning models, a metadata file for at least a portion of the media content, the metadata file including one or more metadata descriptions; generate a text description of the media content based on the one or more metadata descriptions of the metadata file; and annotate the media content use the text description.

In another example, a non-transitory computer-readable medium having stored thereon instructions that, when executed by one or more processors, cause the one or more processors to: obtain media content; generate, using one or more machine learning models, a metadata file for at least a portion of the media content, the metadata file including one or more metadata descriptions; generate a text description of the media content based on the one or more metadata descriptions of the metadata file; and annotate the media content use the text description.

In some aspects, the apparatuses described above can be can be part of a computing device, such as a server computer, a mobile device, a set-top box, a personal computer, a laptop computer, a tablet computer, a television, a virtual reality (VR) device, an augmented reality (AR) device, a mixed reality (MR) device, a wearable device, and/or other device. In some aspects, the apparatus further includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 7 is a diagram illustrating examples of sentences that can be used for a description of media content, in accordance with some examples;

DETAILED DESCRIPTION

Figure 1A:
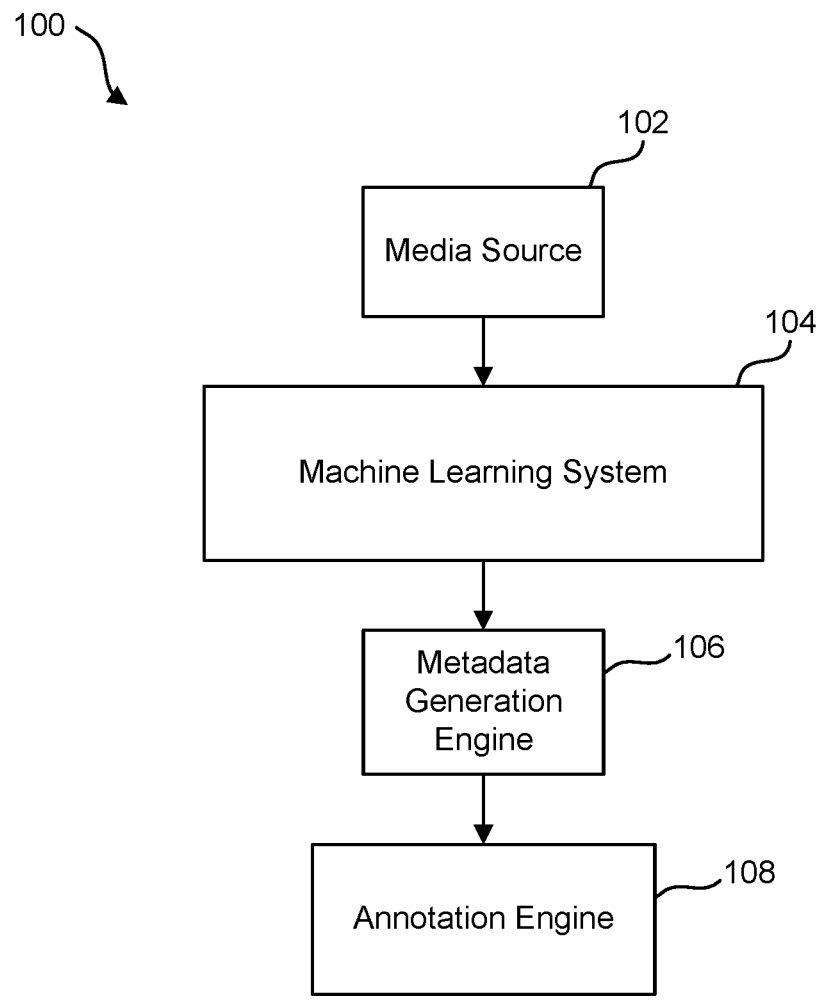
FIG. 1A is a block diagram illustrating an example of a system for generating metadata that can be used to annotate media content, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Various types of media content can be provided for consumption, including video, audio, images, and/or other types of media content. In some cases, additional content can be generated and used to annotate the media content. For example, a media summary (e.g., a highlight reel, a movie preview or trailer, etc.) can be generated for summarizing an item of media content (e.g., a sports event, a movie, etc.). In another example, an audio description can be generated and played along with an item of media content. For instance, an audio description can include a description of visual information from a video, and can be played along with the video.

There can be challenges in generating additional content for annotating media content. In some cases, generating media summaries (e.g., highlight reels, movie previews or trailers, among others) and audio descriptions can be a time-consuming and expensive process. An audio description can include audio that audibly describes (based on the audio) media content being presented (e.g., a movie or show being displayed). For example, it can be difficult for an automated process to select the appropriate audio content (e.g., which sentences to use, which objects to describe, etc.) to use for an audio description. In another example, it can be challenging to capture and select the most relevant media segments at different points in a video (e.g., corresponding to different points in time during an event). Such difficulties are exacerbated when a large volume of media content is available for processing.

Systems, apparatuses, methods (or processes), and computer-readable media (collectively referred to herein as "systems and techniques") are described herein for generating metadata for media content. In some examples, the media content can include video content (e.g., a movie, a show, a home video, etc., which may also include audio content), audio content (e.g., a song, an album, etc.), a combination of audio and video, and/or other media content. The systems and techniques can use the metadata to annotate the media content. For example, the systems and techniques can generate a description for annotating the media content, such as an audio description for the media content, a media summary (e.g., a highlight reel, a movie preview or trailer, or the like) of the media content, and/or another type of description for the media content. In some cases, the systems and techniques can use one or more machine learning models (e.g., by implementing a combination of multiple machine learning models) to generate the description of media content. In some examples, the description can be targeted to a particular user (e.g., based on a user's previous viewing habits, based on an age, gender or other demographic characteristic of the user, etc.). For instance, the systems and techniques can determine that a user watches action movies more than comedy movies, and can generate a movie summary of a movie that includes highlights of the action scenes in the movie and has little to no comedy scenes from the movie.

As noted above, the systems and techniques can use the description of the media content to annotate the media content. For instance, the one or more machine learning models can be used to generate a description (e.g., an audio description, a media summary, etc.) for a video. The description can identify when changes take place, which characters are displayed at different points in the video, character actions that are being performed, among other features associated with the video.

The systems and techniques described herein can be used to efficiently generate media content descriptions in an automated manner, allowing savings in computing resources, cost, and/or time (e.g., as compared to other automated systems and to manual curation of such descriptions). Examples of media content descriptions include an audio description (e.g., audio describing displayed content), a media summary (e.g., a highlight reel, a movie preview or trailer, among others), and/or other description of media content. For instance, the automated generation of audio descriptions can also allow a greater percentage of media content to be provided to individuals with visual impairments in an effective manner. In one example, a person that has a visual impairment may rely on an additional audio description to comprehend and enjoy media content. In some cases, various jurisdictions (e.g., countries, states, cities, etc.) may require a specific percentage of content (e.g., broadcast content, streaming or over-the-top (OTT) content, movies, and/or other content) to have accompanying audio description tracks. The techniques and systems described herein can allow the percentage to be met or exceeded in an efficient manner.

FIG. 1A is a block diagram illustrating an example of a system 100 for generating metadata that can be used to annotate media content. The system 100 includes various components, including a media source 102, a machine learning system 104, a metadata generation engine 106, and an annotation engine 108. The system 100 can include one or more computing devices (e.g., personal computers, server computers, and/or other types of computing devices) that can process media content from the media source 102 and generate metadata and/or annotated media content.

Figure 2:
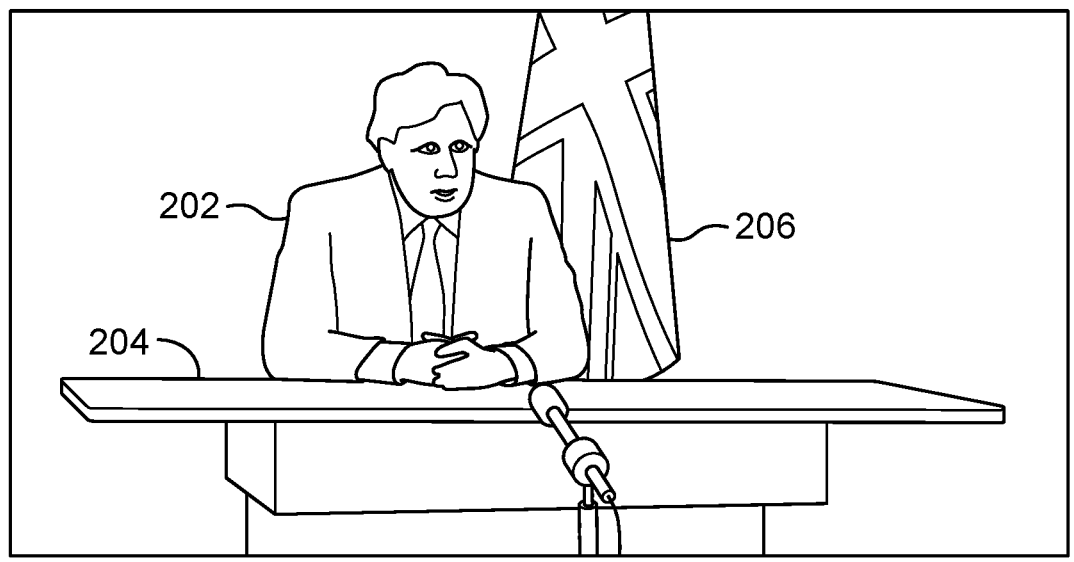
FIG. 2 is a diagram illustrating an example of an image that can be processed for generating metadata, in accordance with some examples.

The media source 102 can provide any type of media content, including video, audio, images, any combination thereof, and/or any other type of media. For instance, the media source 102 can provide video content, such as a movie, a show, and/or other type of video content. FIG. 2 is a diagram illustrating a video frame 200 of a video that can be provided by the media source 102. The video frame 200 includes a person 202 (Boris Johnson) sitting at a table 204. A flag 206 is positioned behind the person 202 in the video frame 200.

The media source 102 can include one or more media capture devices, one or more storage devices for storing media content, a system of a media service provider (e.g., a broadcast content provider, a streaming or OTT content provider, etc.), any combination thereof, and/or any other source of media content. A media capture device can include a personal or commercial video camera (e.g., a digital camera, an Internet Protocol (IP) camera, a video streaming device, or other suitable type of video camera), a mobile or stationary telephone handset (e.g., smartphone, cellular telephone, or the like), an audio capture device (e.g., a voice recorder, a microphone, or other suitable audio capture device), a camera for capturing still images, or any other type of media capture device. In some cases, the system of the media server provider can include one or more server computers.

The machine learning system 104 can process the media content from the media source 102 to generate information that can be used by the metadata generation engine 106 to generate metadata. For instance, the machine learning system 104 can include one or more machine learning models. The machine learning models can include any type of machine learning architecture, such as a convolutional neural network (CNN), an generative adversarial network (GAN), an autoencoder, a deep belief net (DBN), a Recurrent Neural Networks (RNN), or any other suitable neural network. An example of a CNN is described below with respect to FIG. 7.

Each machine learning model of the machine learning system 104 can be trained to perform one or more functions, such as character recognition, object detection, action detection, emotion detection, object tracking (e.g., people pathing, etc.), sentiment analysis, any combination thereof, and/or other functions. In one illustrative example using a video as an example of an item of media content, the machine learning system 104 can use the one or more machine learning models to recognize one or more characters in a scene of the video, detect various objects in the scene, determine which actions the character(s) and/or object(s) are performing in the scene, determine an emotion of the character(s), determine a path or trajectory of the character(s) and/or object(s) in the scene, and determine a sentiment of the scene (e.g., positive, negative, etc.). For instance, referring to FIG. 2 as an example, the machine learning system 104 can include a first machine learning model that can recognize or determine that the person 202 is Boris Johnson, a second machine learning model that can determine that person 202 has a neutral facial expression (e.g., is not smiling or frowning), a third machine learning model that can detect the flag 206 in the video frame 200, and a fourth machine learning model that can determine that the person 202 is sitting at a table, and/or other machine learning models.

The metadata generation engine 106 can obtain the output of the machine learning system 104. Using the output, the metadata generation engine 106 can generate metadata (e.g., a metadata file) describing the media content. In some cases, the metadata can include metadata descriptions that can be used for annotating the media content. For instance, again referring to FIG. 2 as an example, the metadata generation engine 106 can generate a first metadata description for the character (Boris Johnson) determined for the person 202, a second metadata description for the facial expression of the person 202, a third metadata description for the flag 206 in the video frame 200, a fourth metadata description indicating the person 202 is sitting at the table, and/or other metadata descriptions.

The annotation engine 108 can obtain the metadata generated by the metadata generation engine 106. The annotation engine 108 can use the metadata to generate a media content description of the media content (e.g., an audio description, a media summary, and/or other description of media content). The annotation engine 108 can then annotate the media content using the description. Using the text description noted above as an illustrative example, the annotation engine 108 can convert the text description (including the metadata descriptions) to an audio description. Any type of text-to-speech (TTS) conversion algorithm or tool can be used to convert the text description to an audio description. The audio description can include audio describing the various aspects of the media content, such as aspects related to each image or scene of a video. In one illustrative example, the audio description can include audio describing each object or item in each image or scene of a video (e.g., a person or people in a scene, objects in the scene, etc.), whether the scene is indoors or outdoors, action occurring in the scene, and/or can describe other aspects of the video. For instance, referring to FIG. 2, the audio description can include audio describing that Boris Johnson, a male of approximately 36 to 54 years old, is wearing a tie and is not smiling, is sitting at a table, and appears to have mixed emotion while discussing a disease.

In some examples, as described in more detail below, the metadata generation engine 106 or the annotation engine 108 can generate template sentences for a text description of the media content. The template sentences can include placeholder metadata tags for certain words in the sentences. The metadata descriptions generated by the metadata generation engine 106 can be used to replace the placeholder metadata tags.

Figure 1B:
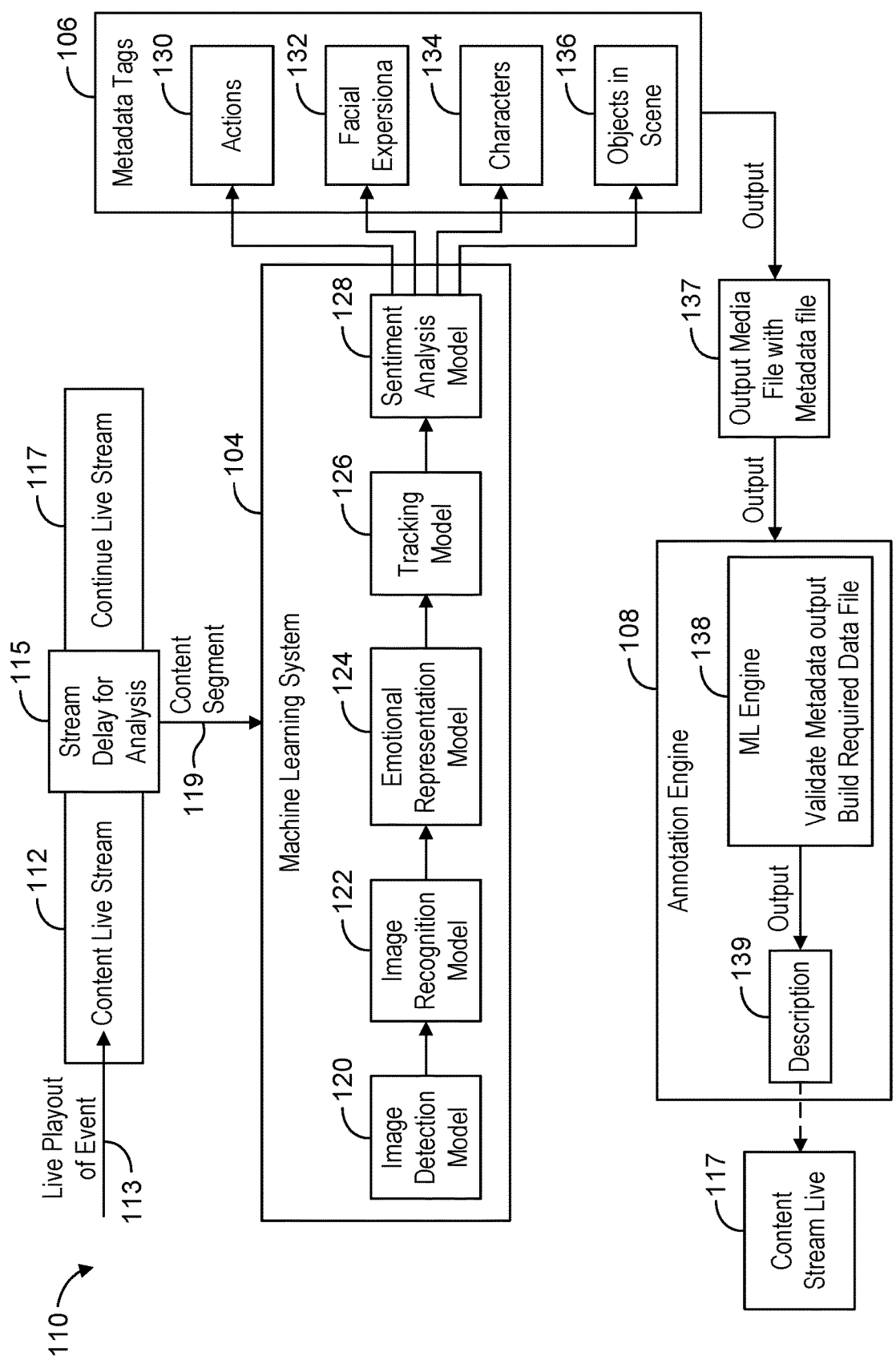
FIG. 1B is a block diagram illustrating another example of a system for generating metadata that can be used to annotate media content, in accordance with some examples.
Figure 1C:
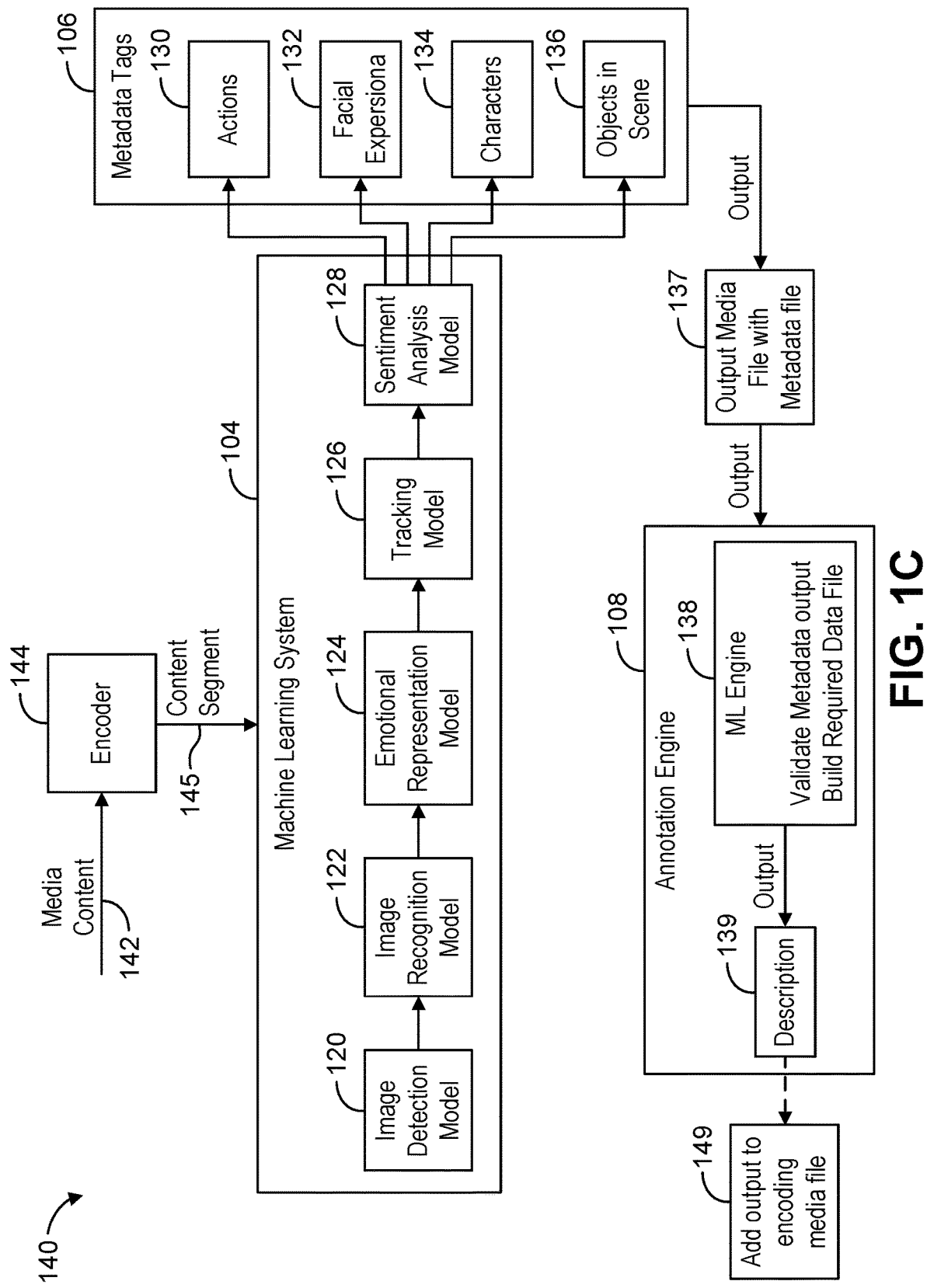
FIG. 1C is a block diagram illustrating another example of a system for generating metadata that can be used to annotate media content, in accordance with some examples.

The system 100 can perform the operations described above before encoding the media content or post-encoding of the media content. FIG. 1B and FIG. 1C are diagrams illustrating other example systems that can generate metadata used to annotate media content. FIG. 1B is a system 110 that can be applied to live video content that is delayed (before encoding of the video content). For example, a content live stream 112 is output that includes a live playout 113 of an event. The live playout 113 of the event is delayed for transmission to one or more devices, resulting in a delayed stream 115 that is analyzed by the system 110. For instance, a content segment 119 is shown as being processed by the system 110. Once the delayed stream 115 is processed by the system 110, the live stream is output to the one or more devices (shown as output live stream 117).

FIG. 1C is a system 140 that can be applied to previously-encoded video content. For example, media content 142 (e.g., video content) is provided to an encoder 144. The encoder 144 can encode (or compress) the media content 142 using any suitable encoding technique. Using video content as an illustrative example of the media content 142, the encoder 144 can perform video encoding according to one or more of the moving picture experts group (MPEG) standards, the advanced video coding (AVC) standard, the high-efficiency video coding (HEVC) standard, and/or other video coding standard. The encoder 144 can output an encoded media file that can include a number of content segments. An encoded content segment 145 can then be processed by the system 140 (e.g., using the machine learning system 104). After processing the encoded content segment 145, the system 140 can add the output (at block 149) to the encoded media file generated by the encoder 144.

Each content segment (e.g., content segment 119, content segment 145, or other content segment) of the media content that is processed by the system (e.g., the system 100, the system 110, or the system 140) can include a particular duration of the media content. In some examples, each particular duration is a particular scene of the media content, in which case each identified scene is processed by the system. In some cases, a scene within the media content can be identified using a scene detection tool, such as Rekog ML or other scene detection tool. In some examples, each particular duration is a segment having a period of time (e.g., each 10 second segment, each 20 second segment, or other period of time) within the media content. In one illustrative example, every 10 second segment of the media content can be processed by the system.

Similar to the system 100, the system 110 and the system 140 include the machine learning system 104, the metadata generation engine 106, and the annotation engine 108. The machine learning system 104 in FIG. 1B and FIG. 1C includes various machine learning models, including an image detection model 120, an image recognition (or object recognition) model 122, an emotional representation model 124, a tracking model 126, and a sentiment analysis model 128. In some examples, the machine learning system 104 can include other types of machine learning models. The machine learning models of the machine learning system 104 can process each content segment of the media content and can output information used by the metadata generation engine 106 to generate metadata (e.g., metadata descriptions) of the corresponding content segment.

The image detection model 120 can perform object detection (e.g., to detect the flag 206 in the video frame 200 of FIG. 2), action detection (e.g., that the person 202 in the video frame 200 of FIG. 2 is sitting and talking), and/or other image detection functions on a content segment (e.g., the content segment 119 or the content segment 145). The image recognition model 122 can perform object and/or character recognition (e.g., to identify the person 202 in the video frame 200 of FIG. 2 as Boris Johnson) on the content segment. The emotional representation model 124 can process the content segment to determine an emotional representation of a person or other object in the content segment (e.g., to determine that the person 202 in the video frame 200 of FIG. 2 has positive emotion). The tracking model 126 can perform a tracking operation to track a path or trajectory of a person and/or other objects (e.g., people pathing) in the content segment operation. The sentiment analysis model 128 can process audio associated with the content segment and can perform a speech-to-text function or other function to determine a sentiment of the audio.

The machine learning system 104 can provide the output from the models 120-128 to the metadata generation engine 106. As noted above, metadata generation engine 106 can generate metadata describing the media content. In some examples, the metadata can include a metadata file with metadata descriptions that can be used for annotating the media content. In some examples, the metadata generation engine 106 can tag metadata for a particular content segment with one or more timestamps corresponding to the time or times of the content segment within the media content. For example, if a content segment is a scene occurring from time 5:00 (corresponding to minute 5) to time 7:30 (corresponding to seven minutes and 30 seconds), a first timestamp of 5:00 and a second timestamp of 7:30 can be assigned to the content segment. In another example, for the content segment occurring from minute 5:00 to minute 7:30, a first timestamp of 5:00 and a duration of 2:30 (indicating a segment starting at minute 5:00 and lasting for 2 minutes and 30 seconds) can be assigned to the content segment. Any other timestamp format can be used to indicate a time within the media content for which metadata applies. The timestamps can be used to align the metadata with the media content when generating the description of the media content (e.g., an audio description, a media summary, and/or other description of media content).

As noted above, the metadata can include information indicating what is happening (e.g., what actions are occurring) in a given scene or period of time associated with the content segment, an identity of the individuals in the content segment, what people are wearing in the content segment, the position of the people depicted in the content segment, an emotion such as facial expressions (e.g., smiling or frowning) of the people, a sentiment (e.g., positive, negative, etc.) of the people, any combination thereof, and/or other information. For instance, as shown in FIG. 1B and FIG. 1C, the metadata can include metadata descriptions for one or more actions 130 (e.g., based on the output from the image detection model 120), one or more facial expressions 132 of people depicted in the content segment (e.g., based on the output from the emotional representation model 124), one or more characters 134 depicted in the content segment (e.g., based on the output from the image recognition model 122), one or more objects 136 detected in the scene of the content segment (e.g., based on the output from the image detection model 120), one or more sentiments determined for people depicted in the content segment (e.g., based on the output from the sentiment analysis model 128), any combination thereof, and/or other metadata.

In one illustrative example, the image recognition model 122 can identify particular character(s) within a content segment and the tracking model 126 can perform people pathing to determine a location of the character(s) within the content segment (e.g., a location or position of the character within each video frame of the content segment). The metadata generation engine 106 can generate metadata descriptions with information identifying the character(s) and the location of the character(s). The characters identified by the image recognition model 122 will be those whose names can be identified using the image recognition process.

In some cases, when multiple characters are identified in a content segment, a priority score can be generated for the characters. The metadata for higher priority characters (with higher scores than other characters identified in a content segment) can be prioritized over the lower priority characters for inclusion in a description 139 generated by the annotation engine 108. For instance, the metadata generation engine 106 can add the priority score for a character identified in a content segment to the metadata for the content segment. In some cases, the annotation engine 108 can use the priority score included in the metadata to select the character with the highest score as being a central or key character of the content segment.

The priority score can be based on various factors, such as whether a name is identified for the character, whether an age and/or gender is identified for the character, a position of the character in the scene associated with the content segment (e.g., whether the character is located in a center third of the screen or frame, whether the character is located in the right third of the screen or frame, whether the character is located in the left third of the screen or frame, etc.), whether the character is identified as performing an action, any combination thereof, and/or other factors. Using position as an illustrative example, a character that is located in the middle of a scene can be prioritized over characters that are located in the edge of a scene (relative to the video frames of the content segment).

In some examples, a priority score for a character can be generated by assigning points to the character based on the various factors noted above. In one illustrative example, points can be assigned as follows: 50 points if a character is identified by name; 10 points if a character is identified by age and/or gender; 20 points if a character is identified as being in the center third of the screen, 5 points if a character is identified in the other thirds of the screen (e.g., the right third or the left third); 20 points if a character is identified as performing an action; any combination thereof. Any other point-assignment mechanism can be used to generate a priority score.

The metadata generation engine 106 can output the metadata (e.g., the metadata file including the metadata descriptions) and the media file including the content segment (e.g., content segment 119 or content segment 145). The combined media file and metadata file are shown collectively as file 137 in FIG. 1B and FIG. 1C. In some cases, once the metadata is generated based on the output from each of the models of the machine learning system, the metadata generation engine 106 can combine the metadata into a series of metadata files that can be associated to the media content. As noted above, the metadata can be time-coded with timestamps to allow the metadata to be identified as it relates to each content segment (e.g., scene or time point) within the larger media content. In some examples, the metadata files including the metadata can be used to supply metadata for the media content. Examples of uses for the metadata files include searching for specific actors, specific pieces of dialogue, actions (e.g., riding a bike, scoring a goal, etc.), emotions (e.g., happy, angry, etc.), among others.

The annotation engine 108 can obtain the file 137 output by the metadata generation engine 106. As shown in FIG. 1B and FIG. 1C, the annotation engine 108 can include a machine learning engine 138. As described in more detail below, the machine learning engine 138 can process the metadata generated by the metadata generation engine 106 to validate the metadata (e.g., as shown and described with respect to FIG. 6). The machine learning engine 138 can also generate a description 139 that will be used to annotate the media content. The description 139 can include a media file, a segment of media or media segment (including audio and/or video data), and/or other media content.

In some examples, the description 139 can include an audio description that will be used to annotate the media content. In some cases, the audio description can be an audio file that can be added as an additional audio track to the content segment. For example, as described in more detail below, the metadata generation engine 106 or the annotation engine 108 can generate template sentences for a text description of the media content. The template sentences can include placeholder metadata tags for certain words in the sentences. The annotation engine 108 (e.g., the machine learning engine 138) can use the metadata descriptions generated by the metadata generation engine 106 to replace the placeholder metadata tags. The annotation engine 108 can generate the audio description by converting the sentences with the metadata descriptions to audio.

In some examples, the description 139 can include a media summary (e.g., a highlight reel, a movie preview or trailer, etc.) that will be used to annotate the media content. As noted above, the metadata files including the metadata can be used to supply metadata for the media content, which can allow the media content to be searched. By allowing the media content to be searched using the metadata files, the annotation engine 108 can produce the description 139. In one illustrative example, the annotation engine 108 can obtain all the content segments of the media content where there occurs a particular emotion (e.g., a happy emotion). Using the obtained content segments with happy emotions, the annotation engine 108 can create a media summary (e.g., a highlight reel, a movie preview or trailer, etc.) that focuses on the happy portions of the media content.

The annotation engine 108 can output the description 139 along with the media file including the content segment. In some examples, as shown in FIG. 1B, the media file and the description 139 can be output with the content live stream 117. In some examples, as shown in FIG. 1C, the media file and the description 139 can be added to the encoded media file generated by the encoder 144.

While the system 100, the system 110, and the system 140 are shown to include certain components, one of ordinary skill will appreciate that the systems 100, 110, and 140 can include more or fewer components than those shown in FIG. 1A-FIG. 1C. For example, the system 100, the system 110, and/or the system 140 may also include, in some instances, one or more memory (e.g., one or more RAM, ROM, cache, buffers, and/or the like) and/or processing devices that are not shown in FIG. 1A-FIG. 1C.

The components of the system 100, the system 110, and the system 140 can include electronic circuits or other electronic hardware, which can include one or more programmable electronic circuits (e.g., microprocessors, graphics processing units (GPUs), digital signal processors (DSPs), central processing units (CPUs), neural processing engines (NPEs) or neural processing units (NPUs), or other suitable electronic circuits), computer software, firmware, or any combination thereof, to perform the various operations described herein. In some cases, the machine learning system 104 can leverage the architectures of the CPU, DSP, GPU, and the NPU or NPE to dynamically determine the best means to run the neural networks of the various models (e.g., the models 120-128), while optimizing metrics such as latency, throughput, battery, memory, CPU, among others. In one illustrative example, the operations of the machine learning system 104 can be implemented using a NPE that can run one or more neural networks, a GPU, and/or a DSP. In another example, the operations of the machine learning system 104, the metadata generation engine 106, and/or the annotation engine 108 can be implemented using a CPU, a GPU, and/or other processing device or unit.

Figure 3:
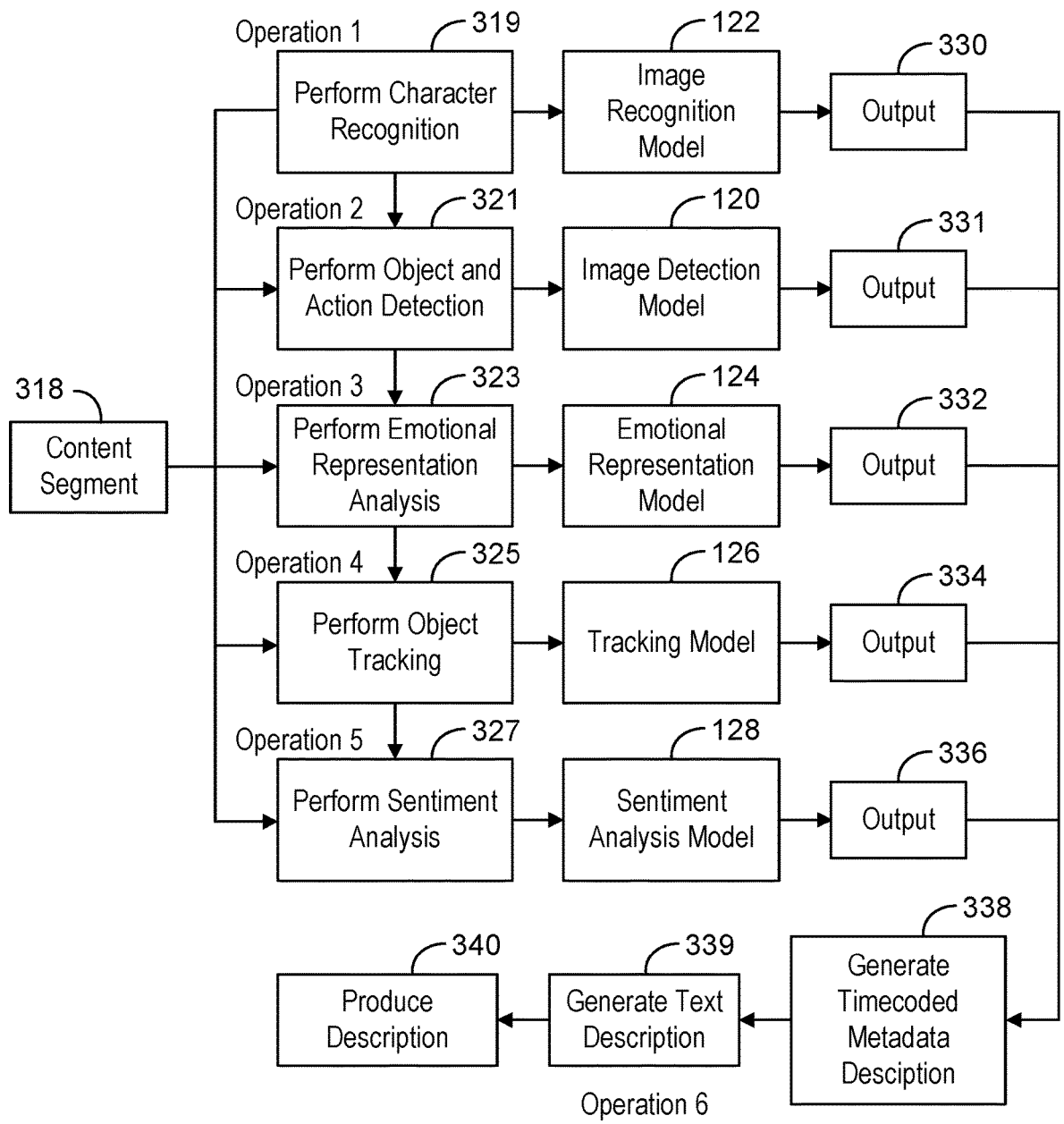
FIG. 3 is a diagram illustrating an example of a process for generating metadata, in accordance with some examples.
Figure 4:
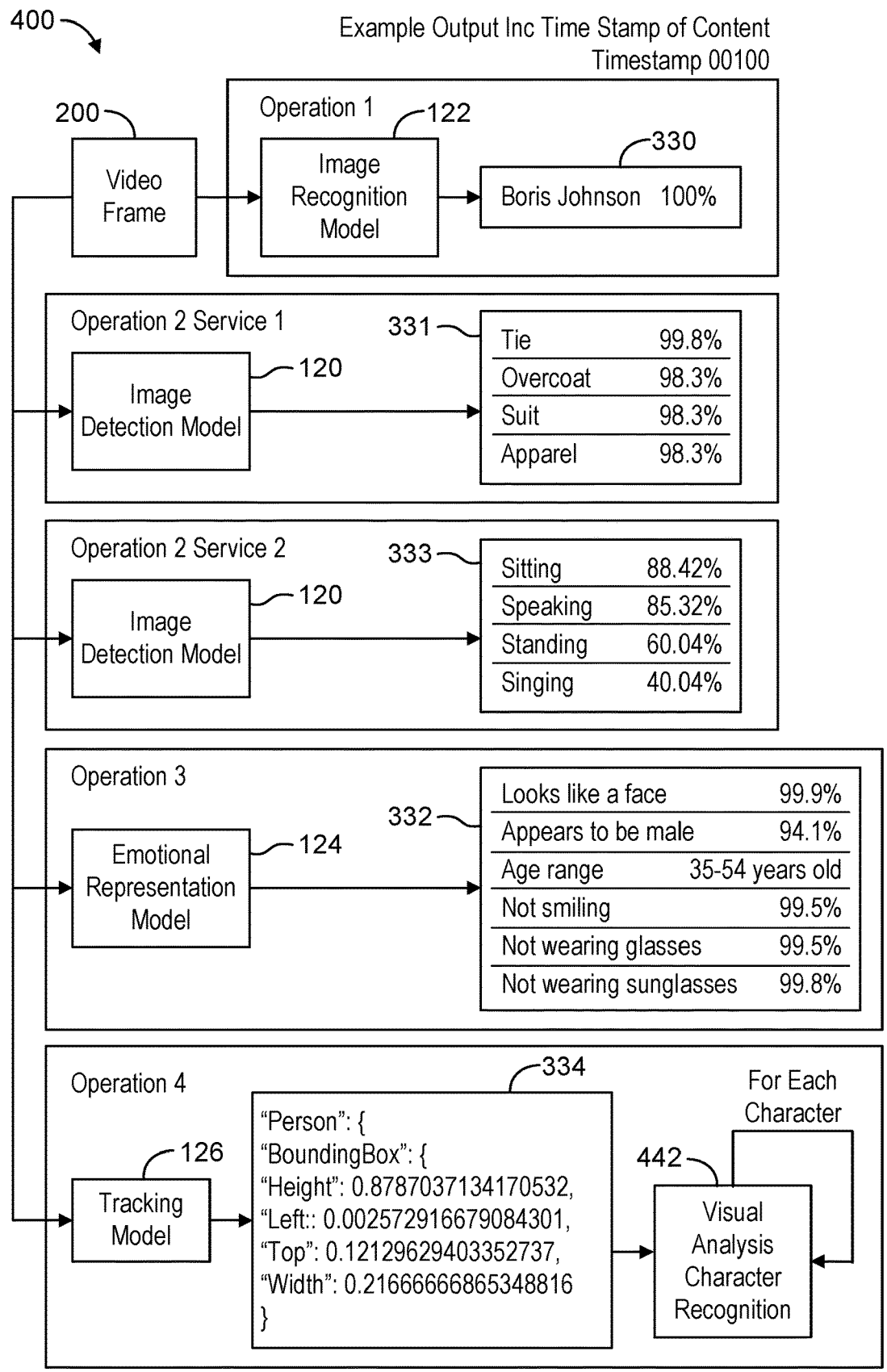
FIG. 4 is a diagram illustrating an example of a process for generating metadata, in accordance with some examples.
Figure 5:
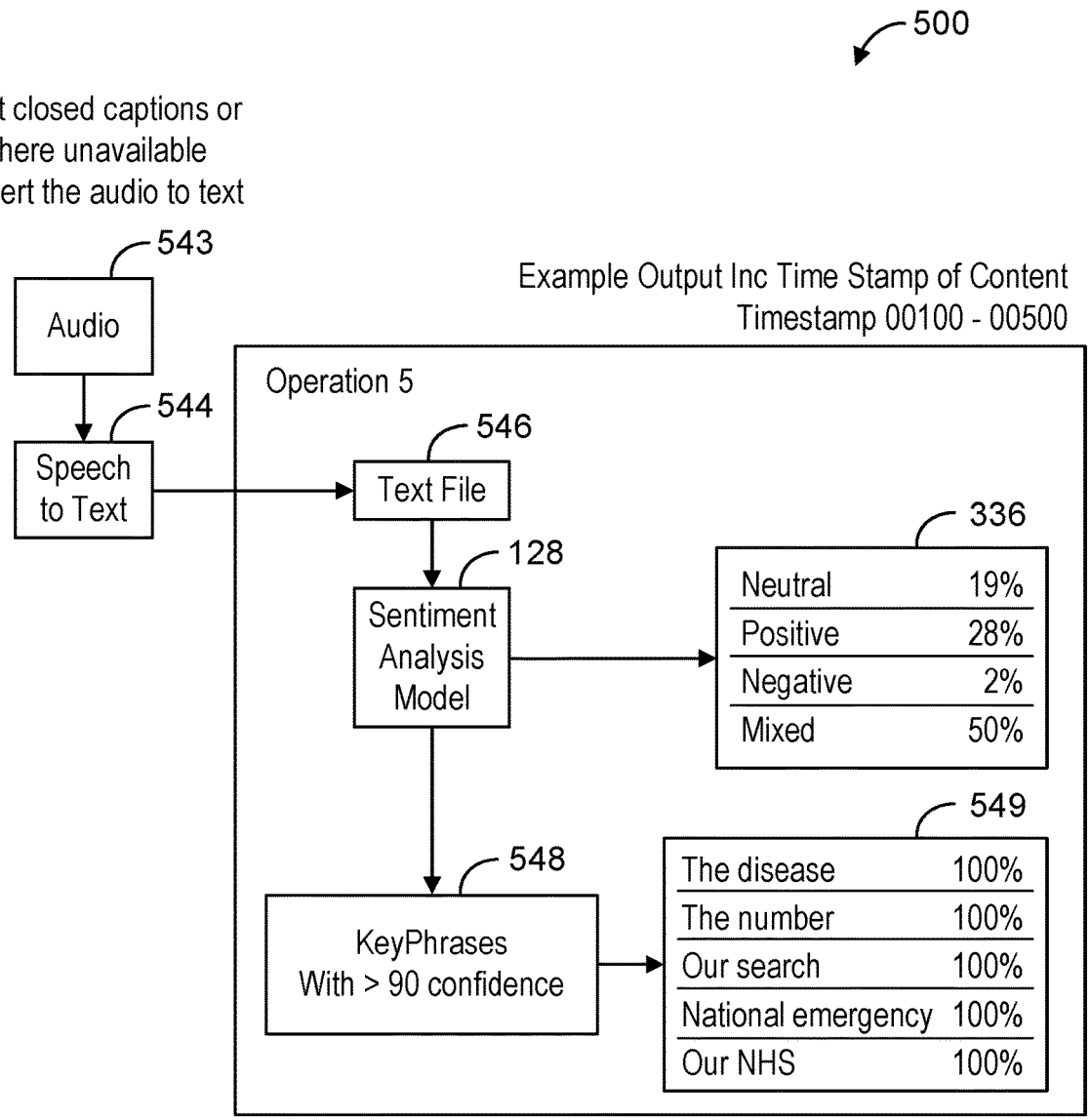
FIG. 5 is a diagram illustrating an example of a process for generating metadata, in accordance with some examples.
Figure 6:
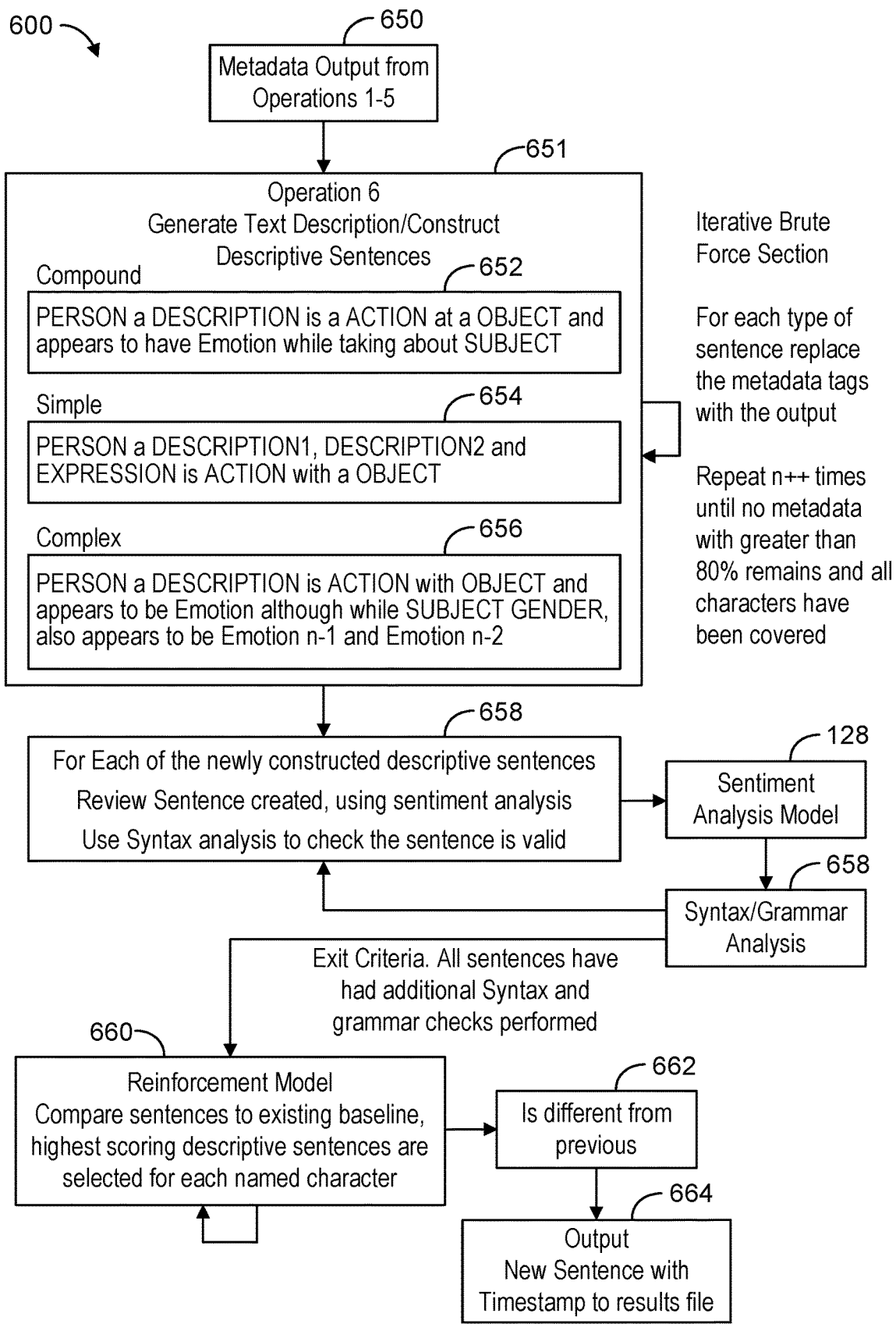
FIG. 6 is a diagram illustrating an example of a process for processing metadata, in accordance with some examples.

FIG. 3 is a diagram illustrating an example of a process 300 for generating metadata. FIG. 4-FIG. 6 are diagrams illustrating further operations of the process 300 of FIG. 3. The process 300 (and the processes 400-600 of FIG. 4-FIG. 6) is described as generating an audio description output. However, the process 300 (and the processes 400-600 of FIG. 4-FIG. 6) can also be used to generate other types of descriptions of media content, such as a media summary and/or other description of media content.

The process 300 receives a content segment 318 and can perform character recognition at block 319 using the image recognition model 122. For instance, the image recognition model 122 can identify one or more characters in the content segment 318. Using FIG. 2 as an illustrative example, the image recognition model 122 can identify that the person 202 in the video frame is Boris Johnson. The image recognition model 122 can generate an output 330 based on performing the character recognition on the content segment 318. In some examples, the output 330 can be used by the metadata generation engine 106 to generate a metadata description describing the identified character(s). In some examples, the image recognition model 122 can generate the metadata description, in which case the output 330 can include the metadata description describing the identified character(s). The character recognition operations are collectively referred to as operation 1 (as illustrated in FIG. 3).

The process 300 can perform object and action detection on the content segment 318 at block 321 using the image detection model 120. Using FIG. 2 as an illustrative example, the image detection model 120 can detect the flag 206 in the video frame 200 and can detect that the person 202 in the video frame 200 is sitting down and talking. The image detection model 120 can generate an output 331 based on performing the object and action detection on the content segment 318. In some examples, the output 331 can be used by the metadata generation engine 106 to generate a metadata description describing the detected object(s) and action(s). In some examples, the image detection model 120 can generate the metadata description. In such examples, the output 331 can include the metadata description describing the detected object(s) and action(s). The object and action detection operations are collectively referred to as operation 2 (as illustrated in FIG. 3).

At block 323, the process 300 can perform emotional representation analysis using the emotional representation model 124. For instance, the emotional representation model 124 can identify one or more emotions of people depicted in the content segment 318. Using FIG. 2 as an illustrative example, the emotional representation model 124 can detect that the person 202 in the video frame has a positive (e.g., happy) or a neutral emotion. The emotional representation model 124 can generate an output 332 based on performing the emotional representation analysis on the content segment 318. In some examples, the output 332 can be used by the metadata generation engine 106 to generate a metadata description describing the detected emotion(s). In some examples, the emotional representation model 124 can generate the metadata description, in which case the output 330 can include the metadata description describing the detected emotion(s). The emotional representation analysis operations are collectively referred to as operation 3 (as illustrated in FIG. 3).

The process 300 can perform object tracking (e.g., people pathing or tracking) on the content segment at block 325 using the tracking model 126. Using FIG. 2 as an illustrative example, the tracking model 126 can detect a location of the person 202 in the video frame 200. In some cases, the tracking model 126 can output a bounding region (e.g., a bounding box, a bounding circle, a bounding ellipse, or a bounding region having another shape) that identifies the location of the object. The tracking model 126 can generate an output 334 based on performing the object tracking on the content segment 318. In some cases, the output 334 can be used by the metadata generation engine 106 to generate a metadata description describing the location of the object(s). In some examples, the tracking model 126 can generate the metadata description. In such examples, the output 334 can include the metadata description describing the location of the detected object(s). The object tracking operations are collectively referred to as operation 4 (as illustrated in FIG. 3).

At block 327, the process 300 can perform sentiment analysis using the sentiment analysis model 128. For instance, the sentiment analysis model 128 can identify the sentiment of audio provided by one or more people depicted in the content segment 318. Again using FIG. 2 as an illustrative example, the sentiment analysis model 128 can determine (e.g., based on the text of the audio generated using a speech-to-text conversion function) that the person 202 in the video frame has a positive sentiment when speaking. An example of sentiment analysis of audio based on the text generated from the audio is provided below. The sentiment analysis model 128 can generate an output 336 based on performing the sentiment analysis on the content segment 318. In some examples, the output 336 can be used by the metadata generation engine 106 to generate a metadata description describing the detected emotion(s). In some examples, the sentiment analysis model 128 can generate the metadata description, in which case the output 336 can include the metadata description describing the detected emotion(s). The sentiment analysis operations are collectively referred to as operation 5 (as illustrated in FIG. 3).

At block 338, the process 300 generates a timecoded metadata description. In some cases, the metadata generation engine 106 can generate the timecoded metadata description. For instance, as described above, the metadata generation engine 106 can tag metadata for a particular content segment with one or more timestamps. The one or more timestamps can correspond to the time or times of the content segment within the media content. The timestamps can be used to align the metadata with the media content when generating the description of the media content.

The process 300 can generate a text description at block 339 (referred to as operation 6). For example, at block 339, the process 300 can use the timecoded metadata description (e.g., a metadata file) generated at block 338 to generate or compile a list of sentences using sentence types of a given language (e.g., the English language, the Spanish language, and/or other language or dialect). In some examples, the sentences can be generated for metadata having a confidence score that is greater than a confidence threshold (e.g., 70%, 80%, 85%, 90%, or other suitable amount), as described below. Details regarding operation 6 are described below with respect to FIG. 6. At block 340, the process 300 produces or generates the audio description using the text description generated at block 339.

FIG. 4 is a diagram illustrating an example of a process 400 for performing the operations 1-4 of FIG. 3 on the video frame 200 of FIG. 2. As shown in FIG. 4, each operation has a specific expected outcome that is used to generate a full metadata description of the media content (e.g., video content). As shown, the image recognition model 122 can perform character recognition on the video frame 200. Based on the character recognition, the image recognition model 122 provides the output 330 indicating that the person 202 in the video frame 200 is Boris Johnson with a confidence score (or confidence or probability) of 100%. The name "Boris Johnson" can be used as a metadata description for later use by the annotation engine 108 (e.g., to replace one or more placeholder metadata tags when completing sentences for the text description). Confidences or probabilities of a classification-based neural networks are described below with respect to FIG. 7. In some implementations, a confidence threshold can be used to determine which metadata descriptions can be used to replace placeholder metadata tags in sentences. For example, sentences can be generated for metadata that has a confidence score that is greater than a confidence threshold. The confidence threshold can be set to any suitable confidence score level, such as 70%, 80%, 85%, 90%, or other suitable amount. A confidence threshold of 80% will be used herein as an illustrative example.

As shown in FIG. 4 (shown as Operation 2, Service 1), the image detection model 120 can perform object detection on the video frame 200. The output 331 of the object detection performed by the image detection model 120 indicates detection of a tie (with a confidence score of 99.8%), an overcoat (with a confidence score of 98.3%), a suit (with a confidence score of 98.3%), and apparel (with a confidence score of 98.3%). Because all of the confidence scores are greater than the confidence threshold of 80%, the terms "tie," "overcoat," "suit," and "apparel" can be used as metadata descriptions for later use by the annotation engine 108 (e.g., to replace one or more placeholder metadata tags when completing sentences for the text description). The image detection model 120 can also perform action detection (shown as Operation 2, Service 2) on the video frame 200. The output 333 of the action detection performed by the image detection model 120 indicates detection of various actions, including sitting (with a confidence score of 88.42%), speaking (with a confidence score of 85.32%), standing (with a confidence score of 60.04%), and singing (with a confidence score of 40.04%). Because the confidence scores for the actions of sitting and speaking are greater than the confidence threshold of 80%, the terms "sitting" and "speaking" can be used as metadata descriptions for later use by the annotation engine 108 (e.g., to replace one or more placeholder metadata tags). The confidence scores for standing (60.04%) and singing (40.04%) are below the confidence threshold of 80%, and thus may not be used for completing the sentences.

As shown in FIG. 4 as Operation 3, the emotional representation model 124 can process the video frame 200 to determine an emotional representation of the person 202. The output 332 of the emotional representation model 124 indicates that the person 202 looks like a face (with a confidence score of 99.9%), appears to be male (with a confidence score of 94.1%), has an age range of 36-54 years old, is not smiling (with a confidence score of 99.5%), is not wearing glasses (with a confidence score of 99.5%), and is not wearing sunglasses (with a confidence score of 99.8%). Because all of the confidence scores are greater than the confidence threshold of 80%, the phrases "looks like a face," "appears to be male," "age range of 36-54 years old," "not smiling," "not wearing glasses," and "not wearing sunglasses" can be used as metadata descriptions for later use by the annotation engine 108 (e.g., to replace one or more placeholder metadata tags when completing sentences for the text description).

As shown in FIG. 4 as Operation 4, the tracking model 126 can perform object tracking (e.g., people pathing) on the video frame 200 to determine the location of the person 202 in the video frame. The output 334 indicates that the person 202 is a "person" and includes a bounding box with various dimensions. The output 334 also includes the location of the bounding box relative to the video frame 200 (e.g., a left offset and top offset relative to the left and top boundaries of the video frame 200). In some cases, as shown in block 442 of FIG. 4, visual analysis character recognition can be performed for each object detected by the tracking model 126. The character recognition can be used to identify the character for which the location is determined.

FIG. 5 is a diagram illustrating an example of a process 500 for performing operation 5 of FIG. 3 on the video frame 200 of FIG. 2. Operation 5 can be performed on text data. For example, operation 5 can be performed on text (shown as a text file 546) generated from audio 543. The audio 543 can include an audio or voice portion of a content segment (e.g., the audio portion associated with the video frame 200). The process 500 can generate the text file 546 at block 544 by performing speech-to-text conversion. Any suitable speech-to-text conversion tool or algorithm can be used to convert the audio 543 to text. In some examples, operation 5 can be performed on closed caption data that is provided along with the content segment, which can allow the process 500 to skip the speech to text operation at block 544.

As shown in FIG. 5, the sentiment analysis model 128 can process the text file 546 and can determine a sentiment associated with the audio provided by the person 202 in the video frame 200. The output 334 indicates the likelihood that the sentiment of the audio is neutral (with a confidence score of 19%), positive (with a confidence score of 28%), negative (with a confidence score of 2%), and mixed (with a confidence score of 50%). The sentiment analysis model 128 can also identify phrases from the text file 546 that have a confidence above a confidence threshold. The confidence threshold used by operation 5 can be the same or can be different than the confidence threshold used by operations 1-4. A confidence threshold of 90% is used as an illustrative example in FIG. 5. As shown at block 548 of FIG. 5, the sentiment analysis model 128 identifies the following phrases (shown in list 549) with a confidence score greater than 90% from the text file 546: "the disease" (with a confidence score of 100%), "the number" (with a confidence score of 100%), "our search" (with a confidence score of 100%), "national emergency" (with a confidence score of 100%), and "our NHS" (with a confidence score of 100%).

FIG. 6 is a diagram illustrating an example of a process for performing operation 6 of FIG. 3 on the video frame 200 of FIG. 2. Operation 6 can include a brute force approach in combination with the machine learning models (e.g., the sentiment analysis model 128) of the machine learning system 104 to generate the sentences for the text description that will be used to generate the audio description (at block 340 of the process 300 of FIG. 3) associated with the content segment 318. For example, the process 600 can iterate over the metadata output 650 from operations 1-5 (e.g., generated by the metadata generation engine 106) and can generate multiple descriptive sentences for each possible combination of metadata to produce some or all possible combinations. In particular, at block 651, the process can construct or generate multiple instances of each sentence (e.g., using different sentence types, using different combinations of the metadata descriptions, etc.) that can be selected from for use in the text description.

In some examples, the process 600 can generate different sentence types, such as simple sentences, compound sentences, complex sentences, and/or compound-complex sentences. A simple sentence is an independent clause with no conjunction or dependent clause. A compound sentence is two independent clauses joined by a conjunction (e.g., and, but, or, for, nor, yet, so, etc.). A complex sentence contains one independent clause and at least one dependent clause. The clauses in a complex sentence are combined with conjunctions and subordinators, terms that help the dependent clauses relate to the independent clause. Subordinators can refer to the subject (e.g., who, which), the sequence/time (e.g., since, while), or the causal elements (e.g., because, if) of the independent clause. A compound-complex sentence contains multiple independent clauses and at least one dependent clause. Compound-complex sentences will contain both conjunctions and subordinators.

As noted above, a plurality of template sentences can be provided that include placeholder metadata tags for words in the sentences. Referring to FIG. 6, each sentence generated at block 651 can be designed to be as general as possible with placeholder metadata tags included within the structure of each sentence. For example, each sentence generated at block 651 can be generated based on a sentence template that includes a number of placeholder metadata tags. Various template sentence 652, 654, and 656 are shown in FIG. 6 with placeholder metadata tags shown in all caps text, including PERSON, DESCRIPTION, DESCRIPTION1, DESCRIPTION2, ACTION, OBJECT, SUBJECT, GENDER, and EMOTION-n through EMOTIONn-1. For instance, the template sentence 652 is a compound sentence with placeholder metadata tags PERSON, DESCRIPTION, ACTION, OBJECT, and SUBJECT. The template sentence 654 is a simple sentence with placeholder metadata tags PERSON, DESCRIPTION1, DESCRIPTION2, EXPRESSION, ACTION, and OBJECT. The template sentence 656 is a complex sentence with placeholder metadata tags PERSON, DESCRIPTION, ACTION, OBJECT, EMOTION, EMOTION n-1, EMOTION n-2, SUBJECT, and GENDER. FIG. 7 is a diagram illustrating other examples of sentences that can be generated at block 651.

The metadata descriptions from the metadata output 650 can be used to replace the placeholder metadata tags, in some cases starting with the metadata having the highest confidence scores and then using the metadata having lower metadata scores. In some cases, the process 600 can generate combinations of different sentence type and metadata tags to cover all possible combinations of metadata descriptions having a confidence score greater than the confidence threshold (e.g., a threshold of 80%). In some examples, the process 600 can repeat the process of constructing or generating the sentences using different combinations of the metadata descriptions until no metadata descriptions remain that have a confidence score greater than the confidence threshold and/or until sentences have been generated for all characters identified by the image recognition model 122.

The process 600 can determine whether the sentences generated at block 651 comply with basic rules of the language for which the sentences are to be output (e.g., English). For instance, at block 658, the process 600 can perform sentiment analysis on each sentence using the sentiment analysis model 128. Sentences can be selected that are grammatically correct for the language being used, that are similar in tone and emotion to the scores generated from the review of the content segment (determined at block 327 of process 300), and that compare well to existing content (existing audio descriptions). For example, the sentiment analysis model 128 can perform the text-based sentiment analysis described above to determine a sentiment score (or confidence score) for each of the sentences. In some cases, the sentences generated at block 651 having sentiment (or confidence) scores that are closest to the sentiment scores determined at block 327 (of process 300) for the media segment can be selected for further analysis.

Table 1 below provides example scores generated by the sentiment analysis model 128.

TABLE 1

| Sentence | Sentiment | Syntax Score |
|---|---|---|
| Simple 1 | Neutral 0.43 confidence | Proper noun .99 |
| | Positive 0.01 confidence | Determiner .99 |
| | Negative 0.54 confidence | Noun .99 |
| | Mixed 0.00 confidence | Adposition .99 |
| Simple 2 | Neutral 0.40 confidence | Proper noun .99 |
| | Positive 0.02 confidence | Determiner .99 |
| | Negative 0.56 confidence | Noun .99 |
| | Mixed 0.00 confidence | Adposition .99 |
| Compound 1 | Neutral 0.11 confidence | Proper noun .99 |
| | Positive 0.00 confidence | Determiner .99 |
| | Negative 0.87 confidence | Noun .99 |
| | Mixed 0.00 confidence | Adposition .99 |
| | | Adjective .99 |

TABLE 1-continued

| Sentence | Sentiment | Syntax Score |
|---|---|---|
| Compound 2 | Neutral 0.41 confidence | Proper noun .99 |
| | Positive 0.26 confidence | Determiner .99 |
| | Negative 0.31 confidence | Noun .99 |
| | Mixed 0.00 confidence | Adposition .99 |
| | | Adjective .99 |
| Complex 1 | Neutral 0.11 confidence | Proper noun .99 |
| | Positive 0.02 confidence | Determiner .99 |
| | Negative 0.86 confidence | Noun .99 |
| | Mixed 0.00 confidence | Adposition .99 |
| | | Adjective .99 |
| Complex 2 | Neutral 0.33 confidence | Proper noun .99 |
| | Positive 0.35 confidence | Determiner .99 |
| | Negative 0.30 confidence | Noun .99 |
| | Mixed 0.00 confidence | Adposition .99 |
| | | Adjective .99 |

At block 658, the process 600 can perform a syntax-grammar analysis on the sentences using a syntax-grammar analysis algorithm or tool. For instance, at block 658, the process 600 can linguistically parse the sentences and paragraphs into key concepts, verbs, and proper nouns. Using statistics-based techniques, the words can be compared to the taxonomy of the language being used. The process 600 can reject any sentences that are not well constructed. An illustrative example is as follows:

Pre-Sentence Analysis

Boris Johnson a male of approx 36 to 54 years old wearing a overcoat, suit and not smiling is sitting at a table and appears to be positive although while sitting the number Boris Johnson, also appears to be positive and neutral After Analysis Clarity—high: Positive
Engagement Low: suggesting that this is not the best sentence for use.
Grammar Check Results
　The article 'a' may be incorrect, change to 'an'
　Names should be offset with commas when directly addressing a person,
　Revise to-be with active voice: to be is removed
　Word Repetition—Redundancies—Remove the second use of Boris Johnson
　Positive Noun enhancement: change number to considerable number
Based on the after analysis, the sentence is modified as follows:
　Boris Johnson, a male of approx 36 to 54 years old wearing an overcoat, suit and not smiling is sitting at a table and appears positive although while sitting the considerable number Boris, also appears to display a neutral expression.

Operation 6 can also apply a reinforcement learning model 660. For instance, once the descriptive sentences are generated, the reinforcement learning model 660 can review the sentences to identify which descriptive sentences are most appropriate for the content segment and which sentences contain correct sentence construction. Using data from existing audio descriptions, the reinforcement learning model 660 can be trained to identify sentences or words that provide a quality description for the content segment. The existing audio descriptions can be converted to text (referred to as audio description transcripts) and can be used as reference to determine if the sentences generated at block 651 are of high quality. The reinforcement learning model 660 can generate an appropriateness score for each of the sentences based on a correlation of the sentences to the existing audio descriptions. For example, if a sentence generated at block 651 is similar in structure and content to an existing sentence, then a higher appropriateness score can be assigned to the sentence as compared to sentences that are not as similar to the existing sentence. The sentence with the highest appropriateness score can be selected as the next descriptive sentence for use in the audio description.

In some cases, the training data used for training the reinforcement learning model 660 can include the existing audio descriptions available for media content. For example, the existing audio description transcripts are manually labelled and used as the basis for training the reinforcement learning model 660. In some examples, the input data can be pre-processed using Natural Language Processing (NLP) libraries, such as by performing tokenization, stemming, tagging, parsing etc. Using the training data and one or more loss functions (e.g., L2 loss, etc.), the reinforcement learning model 660 can be trained to identify the associations between the actions and characters identified in the training set with the expected output text. Once the reinforcement learning model 660 is trained to correctly detect the expected output text, the reinforcement learning model 660 can be used to compare the descriptive sentences generated at block 651 to the expected output (of the existing sentences). For example, as noted above, a higher similar score is assigned to a sentence that is similar in structure and content to an existing sentence.

At block 662, the process 600 can process the sentences output by the reinforcement learning model 660 to determine if a sentence output by the reinforcement learning model 660 is too similar to or is the same as a previously-generated sentence. A sentence that is too similar to or is the same as a previous sentence can be discarded to avoid any particular sentence being repeated in the audio description. In some cases, if the sentences being processed at block 662 do not change after a threshold period of time (e.g., 1 second, 2 seconds, etc.), then the output sentence will be updated to a pre-determined sentence (e.g., 'The PERSON remains still') until a different sentence is received.

Before finally selecting a sentence from the different sentences generated at block 651 to use in the text description (which will be converted to an audio description), the process 600 at block 664 can compare the contents of the sentence to the image recognition output 330 generated by the image recognition model 122 (and in some cases the image detection output 331 from the image detection model 120) in order to ensure that the each object from the content segment is addressed in the description.

At block 664, the process 600 includes (e.g., records, encodes, adds, etc.) the sentence with the highest score (from the sentences output from block 662) in the output text description with one or more timestamps. As noted above, a timestamp can be used when generating the audio file (e.g., to align the audio description with the video). For example, the text description can be converted to audio (for the audio file) using a text-to-speech tool or algorithm. The audio file can then be embedded into the video of the media segment.

Table 2 below provides illustrative example of the output obtained by processing video segments including the video frame 200 of FIG. 2 (with Boris Johnson giving a national public address regarding a pandemic) using the process 300 of FIG. 3. As shown, different confidence thresholds are used for different placeholder metadata tags.

TABLE 2

| Placeholder Metadata Tags | Replaced with | Source | With Confidence | Example |
|---|---|---|---|---|
| PERSON | Celebrity Name or Gender | Visual Analysis Character Recognition | >80 | Boris Johnson |
| DESCRIPTION1 | Gender & Age | Visual Analysis Object and Action Detection | >90 | Male 36-54 |
| DESCRIPTION2 | Clothing | Visual Analysis Object and Action Detection | >80 | Tie |
| EXPRESSION | Expression | Visual Analysis Emotional Representation | >80 | Not smiling |
| ACTION | Action | Visual Analysis Object and Action Detection | >70 | Sitting |
| OBJECT | Object | Visual Analysis Object and Action Detection | >70 | Table |
| EMOTION | Emotion | Sentiment Analysis | Top 3 | Mixed |
| SUBJECT | Key Phrases | Sentiment Analysis | Top 10 | The Disease |

An example of the overall sentiment scoring generated by operation 5 of FIG. 3 for the segment associated with the video frame 200 of FIG. 2 is shown in Table 3.

TABLE 3

| Sentiment | Score |
|---|---|
| Neutral | 0.19 confidence |
| Positive | 0.28 confidence |
| Negative | 0.02 confidence |
| Mixed | 0.50 confidence |

Using the scores from table 3 above, the reinforcement learning model 660 can match the scores to the closest scores from the sentences generated at block 651 and can find that the closest match to this from the example sentences from FIG. 7 is the "Complex 2" sentence 766—Boris Johnson a male of approx 36 to 54 years old wearing a overcoat, suit and not smiling is sitting at a table and appears to be positive although while sitting the number Boris Johnson, also appears to be positive and neutral."

As described above, one or more machine learning models can be used by the neural network system 104. The machine learning models can include one or more neural networks. Any suitable neural network can be used by the neural network system 104. In some cases, the neural network can be a network designed to perform classification (e.g., classifying an object in an image or video frame as a particular class or type of object). Illustrative examples of deep neural networks that can be used include a convolutional neural network (CNN), an generative adversarial network (GAN), an autoencoder, a deep belief net (DBN), a Recurrent Neural Networks (RNN), or any other suitable neural network. For instance, a CNN includes an input layer and an output layer, with multiple hidden layers between the input and out layers. The hidden layers of a CNN include a series of convolutional, nonlinear, pooling (for downsampling), and fully connected layers.

Figure 8:
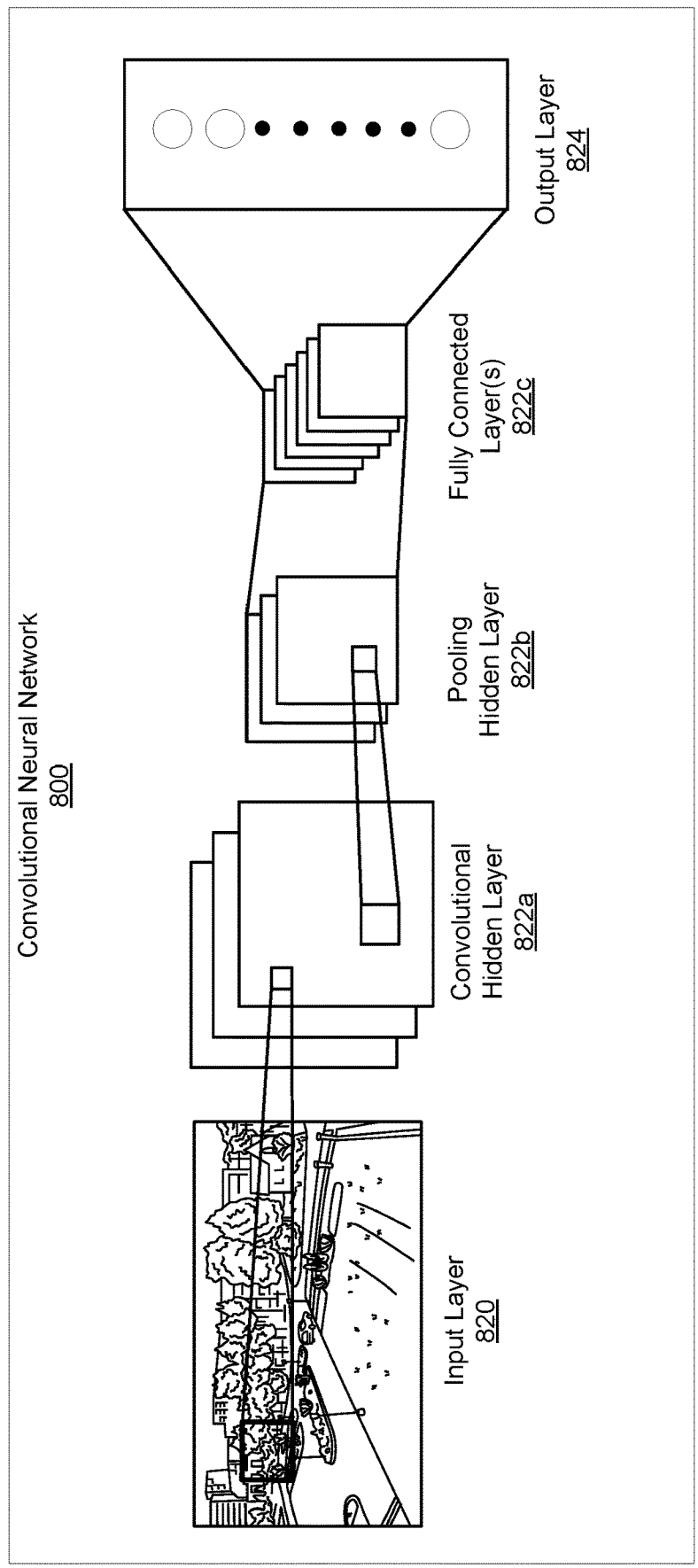
FIG. 8 is a block diagram illustrating an example of a convolutional neural network, in accordance with some examples.

FIG. 8 is an illustrative example of a convolutional neural network 800 (CNN 800). The input layer 820 of the CNN 800 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 822a, an optional non-linear activation layer, a pooling hidden layer 822b, and fully connected hidden layers 822c to get an output at the output layer 824. While only one of each hidden layer is shown in FIG. 8, one of ordinary skill will appreciate that multiple convolutional hidden layers, non-linear layers, pooling hidden layers, and/or fully connected layers can be included in the CNN 800. As previously described, the output can indicate a single class of an object or can include a probability of classes that best describe the object in the image. A class or probability of classes can be generated for each object in an image.

The first layer of the CNN 800 is the convolutional hidden layer 822a. The convolutional hidden layer 822a analyzes the image data of the input layer 820. Each node of the convolutional hidden layer 822a is connected to a region of nodes (pixels) of the input image called a receptive field. The convolutional hidden layer 822a can be considered as one or more filters (each filter corresponding to a different activation or feature map), with each convolutional iteration of a filter being a node or neuron of the convolutional hidden layer 822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 822a. Each connection between a node and a receptive field for that node learns a weight and, in some cases, an overall bias such that each node learns to analyze its particular local receptive field in the input image. Each node of the hidden layer 822a will have the same weights and bias (called a shared weight and a shared bias). For example, the filter has an array of weights (represented by numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 822a is due to each node of the convolutional layer being applied to its corresponding receptive field. For example, a filter of the convolutional hidden layer 822a can begin in the top-left corner of the input image array and can convolve around the input image. As noted above, each convolutional iteration of the filter can be considered a node or neuron of the convolutional hidden layer 822a. At each convolutional iteration, the values of the filter are multiplied with a corresponding number of the original pixel values of the image (e.g., the 5×5 filter array is multipled by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 822a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 822a.

The mapping from the input layer to the convolutional hidden layer 822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 822a can include several activation maps in order to identify multiple features in an image. The example shown in FIG. 8 includes three activation maps. Using three activation maps, the convolutional hidden layer 822a can detect three different kinds of features, with each feature being detectable across the entire image.

In some examples, a non-linear hidden layer can be applied after the convolutional hidden layer 822a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the network 800 without affecting the receptive fields of the convolutional hidden layer 822a.

The pooling hidden layer 822b can be applied after the convolutional hidden layer 822a (and after the non-linear hidden layer when used). The pooling hidden layer 822b is used to simplify the information in the output from the convolutional hidden layer 822a. For example, the pooling hidden layer 822b can take each activation map output from the convolutional hidden layer 822a and generates a condensed activation map (or feature map) using a pooling function. Max-pooling is one example of a function performed by a pooling hidden layer. Other forms of pooling functions be used by the pooling hidden layer 822a, such as average pooling, L2-norm pooling, or other suitable pooling functions. A pooling function (e.g., a max-pooling filter, an L2-norm filter, or other suitable pooling filter) is applied to each activation map included in the convolutional hidden layer 822a. In the example shown in FIG. 8, three pooling filters are used for the three activation maps in the convolutional hidden layer 822a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 822a having a dimension of 24×24 nodes, the output from the pooling hidden layer 822b will be an array of 8×8 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 800.

The final layer of connections in the network is a fully-connected layer that connects every node from the pooling hidden layer 822b to every one of the output nodes in the output layer 824. Using the example above, the input layer includes 28×28 nodes encoding the pixel intensities of the input image, the convolutional hidden layer 822a includes 3×24×24 hidden feature nodes based on application of a 5×5 local receptive field (for the filters) to three activation maps, and the pooling layer 822b includes a layer of 3×12×12 hidden feature nodes based on application of max-pooling filter to 2×2 regions across each of the three feature maps. Extending this example, the output layer 824 can include ten output nodes. In such an example, every node of the 3×12×12 pooling hidden layer 822b is connected to every node of the output layer 824.

The fully connected layer 822c can obtain the output of the previous pooling layer 822b (which should represent the activation maps of high-level features) and determines the features that most correlate to a particular class. For example, the fully connected layer 822c layer can determine the high-level features that most strongly correlate to a particular class, and can include weights (nodes) for the high-level features. A product can be computed between the weights of the fully connected layer 822c and the pooling hidden layer 822b to obtain probabilities for the different classes. For example, if the CNN 800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 824 can include an M-dimensional vector (in the prior example, M=10), where M can include the number of classes that the program has to choose from when classifying each object in the image. Other example outputs can also be provided. Each number in the N-dimensional vector can represent the probability an object is of a certain class. In one illustrative example, if a 10-dimensional output vector represents ten different classes of objects is [0 0 0.05 0.8 0 0.15 0 0 0 0], the vector indicates that there is a 5% confidence or probability that an object in the image is the third class of object (e.g., a dog), an 80% confidence or probability that the object in the image is the fourth class of object (e.g., a human), and a 15% confidence or probability that the object in the image is the sixth class of object (e.g., a kangaroo). The confidence or probability for a class can be considered a confidence level that the object is part of that class.

The CNN 800 can be trained using any suitable training process. For example, the CNN 800 can adjust the weights of the various layers of the CNN 800 using a training process called backpropagation. Backpropagation can include a forward pass, a loss function, a backward pass, and a parameter (e.g., weight, bias, or other parameter) update. The forward pass, loss function, backward pass, and parameter update is performed for one training iteration. The process can be repeated for a certain number of iterations for each set of training images until the CNN 800 is trained well enough so that the weights (and/or other parameters) of the layers are accurately tuned.

For the example of identifying objects in images, the forward pass can include passing a training image through the CNN 800. The weights are initially randomized before the deep learning neural CNN 800 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the CNN 800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the CNN 800 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The deep learning neural CNN 800 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

Figure 9:
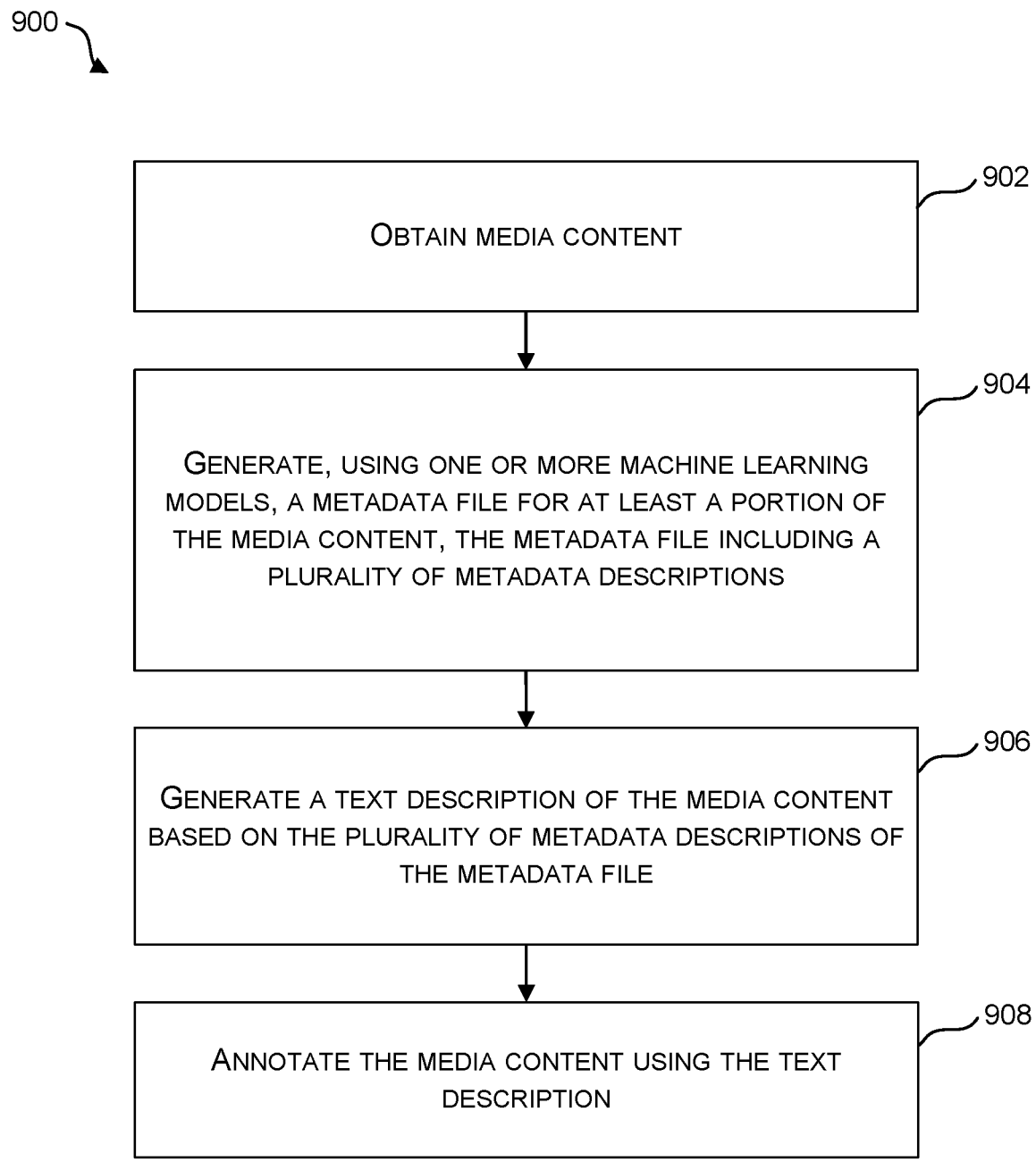
FIG. 9 is a flow diagram illustrating an example of a process for annotating media content using metadata, in accordance with some examples.

FIG. 9 illustrates an example process 900 for annotating media content. At block 902, the process 900 includes obtaining media content. For example, the media content can be provided by the media source 102 of FIG. 1A. In some examples, the machine learning system 104 of FIG. 1A-FIG. 1C can obtain or receive the media content. In some aspects, the media content is live content. In some aspects, the media content is pre-recorded content.

At block 904, the process 900 includes generating, using one or more machine learning models, a metadata file for at least a portion of the media content. The metadata file includes one or more metadata descriptions. For example, the machine learning system 104 can generate the metadata file. In one or aspects, each metadata description of the one or more metadata descriptions is associated with a character depicted in at least the portion of the media content, a facial expression of the character depicted in at least the portion of the media content, an object depicted in at least the portion of the media content, an action occurring in at least the portion of the media content, any combination thereof, and/or other characteristic of the media content. In some cases, the portion of the media content includes a particular duration of the media content. In some examples, the particular duration of the media content includes a segment of the media content.

In some examples, the process 900 can include determining, using the one or more machine learning models, the character depicted in at least the portion of the media content, the facial expression of the character depicted in at least the portion of the media content, the object depicted in at least the portion of the media content, and/or the action occurring in at least the portion of the media content. For example, the machine learning system 104 can determine the character depicted in at least the portion of the media content, the facial expression of the character depicted in at least the portion of the media content, the object depicted in at least the portion of the media content, and/or the action occurring in at least the portion of the media content. In some examples, the process 900 can include generating the one or more metadata descriptions for the character depicted in at least the portion of the media content, the facial expression of the character depicted in at least the portion of the media content, the object depicted in at least the portion of the media content, and/or the action occurring in at least the portion of the media content. For example, the machine learning system 104 and/or the metadata generation engine 106 can generate the one or more metadata descriptions for at least one of the character depicted in at least the portion of the media content, the facial expression of the character depicted in at least the portion of the media content, the object depicted in at least the portion of the media content, and/or the action occurring in at least the portion of the media content.

In some examples, the process 900 can include generating the metadata file at least in part by determining, using a first machine learning model, the character depicted in at least the portion of the media content. For example, the image recognition model 122 illustrated in FIG. 1B-FIG. 4 can be used to determine the character depicted in at least the portion of the media content. The process 900 can include generating a first metadata description for the character depicted in at least the portion of the media content. For example, the machine learning system 104 and/or the metadata generation engine 106 can generate the first metadata description for the character.

In some examples, the process 900 can include generating the metadata file at least in part by determining, using a second machine learning model, the facial expression of the character depicted in at least the portion of the media content. For example, the emotional representation model 124 illustrated in FIG. 1B-FIG. 4 may determine the facial expression of the character depicted in at least the portion of the media content. The process 900 can include generating a second metadata description for the facial expression of the character depicted in at least the portion of the media content. For example, the machine learning system 104 and/or the metadata generation engine 106 can generate the second metadata description for the facial expression of the character.

In some examples, the process 900 can include generating the metadata file at least in part by determining, using a third machine learning model, the object depicted in at least the portion of the media content and the action occurring in at least the portion of the media content. For example, the image detection model 120 illustrated in FIG. 1B-FIG. 4 can determine the object depicted in at least the portion of the media content and the action occurring in at least the portion of the media content. The process 900 can include generating a third metadata description for the object depicted in at least the portion of the media content and/or a fourth metadata description for the action occurring in at least the portion of the media content. For example, the machine learning system 104 and/or the metadata generation engine 106 can generate the third metadata description for the object and/or the fourth metadata description for the action.

In some examples, the process 900 can include generating the metadata file at least in part by determining, using a fourth machine learning model, a path of the character depicted in at least the portion of the media content. For example, the tracking model 126 illustrated in FIG. 1B-FIG. 4 can determine the path of the character depicted in at least the portion of the media content. The process 900 can include generating a fifth metadata description for the path of the character. For example, the machine learning system 104 and/or the metadata generation engine 106 can generate the fifth metadata description for the path of the character.

In some examples, the process 900 includes obtaining audio associated with at least the portion of the media content. The process 900 can include determining, using a fifth machine learning model, a sentiment associated with the audio. For example, the sentiment analysis model 128 illustrated in FIG. 1B-FIG. 5 can determine the sentiment associated with the audio. The process 900 can include generating a sixth metadata description for the sentiment associated with the audio. For example, the machine learning system 104 and/or the metadata generation engine 106 can generate the sixth metadata description for the sentiment associated with the audio.

At block 906, the process 900 includes generating a text description of the media content based on the one or more metadata descriptions of the metadata file. For example, the annotation engine 108 discussed with respect to FIG.

1A-FIG. 7 can generate the text description of the media content based on the one or more metadata descriptions of the metadata file.

In some examples, the process 900 can include generating the text description of the media content at least in part by determining, using a machine learning model, a first character and a second character depicted in at least the portion of the media content. For example, the annotation engine 108 (using the machine learning engine 138) discussed with respect to FIG. 1A-FIG. 7 can determine the first character and the second character depicted in at least the portion of the media content. The process 900 can include determining a first priority score for the first character and a second priority score for the second character. The process 900 can include adding the first priority score and the second priority score to the metadata file. In some examples, the process 900 includes determining the first priority score is higher than the second priority score. The process 900 can include generating, based on determining the first priority score being higher than the second priority score, the text description of the media content using audio data associated with the first character.

In some examples, the process 900 includes associating each metadata description of the one or more metadata descriptions with a corresponding timestamp within the media content. In some examples, the process 900 includes generating one or more metadata files for a plurality of portions of the media content, each metadata file of the one or more metadata files being associated with a corresponding timestamp within the media content. In some cases, each portion of the plurality of portions of the media content includes a corresponding particular duration of the media content.

In some examples, the process 900 includes generating a plurality of sentences using the one or more metadata descriptions. For instance, the process 900 can include determining a subset of metadata descriptions from the one or more metadata descriptions having confidence scores greater than a confidence threshold. In some cases, the process 900 includes discarding one or more metadata descriptions from the one or more metadata descriptions having a confidence score greater than the confidence threshold. The process 900 can include generating the plurality of sentences using the subset of metadata descriptions having confidence scores greater than the confidence threshold. In some cases, the process 900 includes obtaining a plurality of template sentences. Each template sentence of the plurality of template sentences can include one or more placeholder metadata tags. The process 900 can include replacing placeholder metadata tags of the plurality of template sentences with the subset of metadata descriptions having confidence scores greater than the confidence threshold.

The process 900 can further include determining, using a machine learning model, a subset of sentences from the plurality of sentences to use for the text description of the media content. For example, the annotation engine 108 discussed with respect to FIG. 1A-FIG. 7 can determine the subset of sentences from the plurality of sentences to use for the text description of the media content. In some cases, the process 900 can determine the subset of sentences at least in part by determining, using the machine learning model, a corresponding sentiment associated with each sentence of the plurality of sentences. The process 900 can include comparing the corresponding sentiment associated with each sentence of the plurality of sentences to a sentiment associated with at least the portion of the media content. The process 900 can include determining the subset of sentences from the plurality of sentences that are within a sentiment threshold of the sentiment associated with at least the portion of the media content.

At block 908, the process 900 can include annotating the media content using the text description. For example, the annotation engine 108 discussed with respect to FIG. 1A-FIG. 7 can annotate the media content use the text description. In some examples, the process 900 can include generating an audio file using the text description of the media content. The process 900 can annotate the media content using the audio file (e.g., by playing the audio file along with the media content). In some cases, generating the audio file includes converting the text description to an audio description. In such cases, the process 900 can include embedding the audio file into a file of the media content. In some cases, generating the audio file includes generating a media summary of the media content using the text description of the media content. The process 900 can annotate the media content using the media summary (e.g., by playing the media summary along with or separately from the media content).

In some examples, the processes described herein (e.g., processes 300, 400, 500, 600, 900, and/or other processes) may be performed by a computing device or apparatus. In one example, the processes can be performed by the computing system 1000 shown in FIG. 10. The computing device can include any suitable device, such as a mobile device (e.g., a mobile phone), a desktop computing device, a tablet computing device, a wearable device (e.g., a virtual reality (VR) headset, an augmented reality (AR) headset, AR glasses, a network-connected watch or smartwatch, or other wearable device), a server computer, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes may be described or illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (processes 300, 400, 500, 600, 900, and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
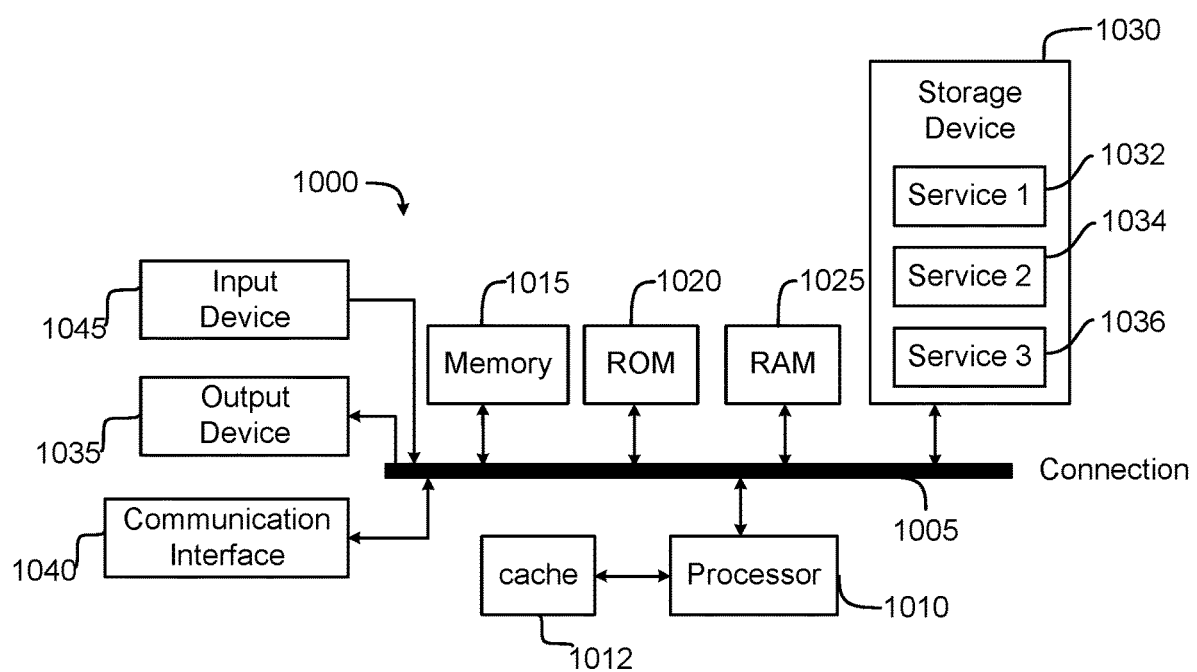
FIG. 10 is a block diagram illustrating an example of a computing system architecture, in accordance with some examples.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re- RAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a process or method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method of annotating media content, the method comprising: obtaining media content; generating, using one or more machine learning models, a metadata file for at least a portion of the media content, the metadata file including one or more metadata descriptions; generating a text description of the media content based on the one or more metadata descriptions of the metadata file; and annotating the media content using the text description.

Aspect 2: The method of Aspect 1, wherein each metadata description of the one or more metadata descriptions is associated with at least one of a character depicted in at least the portion of the media content, a facial expression of the character depicted in at least the portion of the media content, an object depicted in at least the portion of the media content, and an action occurring in at least the portion of the media content.

Aspect 3: The method of Aspect 2, wherein generating the metadata file for at least the portion of the media content includes: determining, using the one or more machine learning models, at least one of the character depicted in at least the portion of the media content, the facial expression of the character depicted in at least the portion of the media content, the object depicted in at least the portion of the media content, and the action occurring in at least the portion of the media content; and generating the one or more metadata descriptions for at least one of the character depicted in at least the portion of the media content, the facial expression of the character depicted in at least the portion of the media content, the object depicted in at least the portion of the media content, and the action occurring in at least the portion of the media content.

Aspect 4: The method of Aspect 2, wherein generating the metadata file for at least the portion of the media content includes: determining, using a first machine learning model, the character depicted in at least the portion of the media content; and generating a first metadata description for the character depicted in at least the portion of the media content.

Aspect 5: The method of Aspect 2, wherein generating the metadata file for at least the portion of the media content includes: determining, using a second machine learning model, the facial expression of the character depicted in at least the portion of the media content; and generating a second metadata description for the facial expression of the character depicted in at least the portion of the media content.

Aspect 6: The method of Aspect 2, wherein generating the metadata file for at least the portion of the media content includes: determining, using a third machine learning model, the object depicted in at least the portion of the media content and the action occurring in at least the portion of the media content; and generating a third metadata description for the object depicted in at least the portion of the media content.

Aspect 7: The method of Aspect 2, wherein generating the metadata file for at least the portion of the media content includes: generating a fourth metadata description for the action occurring in at least the portion of the media content.

Aspect 8: The method of Aspect 2, further comprising: determining, using a fourth machine learning model, a path of the character depicted in at least the portion of the media content; and generating a fifth metadata description for the path of the character.

Aspect 9: The method of Aspect 2, further comprising: obtaining audio associated with at least the portion of the media content; determining, using a fifth machine learning model, a sentiment associated with the audio; and generating a sixth metadata description for the sentiment associated with the audio.

Aspect 10: The method of any of Aspects 1 to 9, further comprising: determining, using a machine learning model, a first character and a second character depicted in at least the portion of the media content; determining a first priority score for the first character and a second priority score for the second character; and adding the first priority score and the second priority score to the metadata file.

Aspect 11: The method of Aspect 10, wherein generating the text description of the media content includes: determining the first priority score is higher than the second priority score; and based on determining the first priority score being higher than the second priority score, generating the text description of the media content using audio data associated with the first character.

Aspect 12: The method of any of Aspects 1 to 11, wherein the portion of the media content includes a particular duration of the media content.

Aspect 13: The method of Aspect 12, wherein the particular duration of the media content includes a segment of the media content.

Aspect 14: The method of any of Aspects 1 to 13, further comprising: associating each metadata description of the one or more metadata descriptions with a corresponding timestamp within the media content.

Aspect 15: The method of any of Aspects 1 to 14, further comprising: generating one or more metadata files for a plurality of portions of the media content, each metadata file of the one or more metadata files being associated with a corresponding timestamp within the media content.

Aspect 16: The method of Aspect 15, wherein each portion of the plurality of portions of the media content includes a corresponding particular duration of the media content.

Aspect 17: The method of any of Aspects 1 to 16, wherein generating the text description of the media content based on the one or more metadata descriptions includes: generating a plurality of sentences using the one or more metadata descriptions; and determining, using a machine learning model, a subset of sentences from the plurality of sentences to use for the text description of the media content.

Aspect 18: The method of any of Aspects 1 to 17, wherein generating the plurality of sentences using the one or more metadata descriptions includes: determining a subset of metadata descriptions from the one or more metadata descriptions having confidence scores greater than a confidence threshold; and generating the plurality of sentences using the subset of metadata descriptions having confidence scores greater than the confidence threshold.

Aspect 19: The method of Aspect 18, further comprising: discarding one or more metadata descriptions from the one or more metadata descriptions having a confidence score greater than the confidence threshold.

Aspect 20: The method of Aspect 18, wherein generating the plurality of sentences using the subset of metadata descriptions includes: obtaining a plurality of template sentences, each template sentence of the plurality of template sentences including one or more placeholder metadata tags; and replacing placeholder metadata tags of the plurality of template sentences with the subset of metadata descriptions having confidence scores greater than the confidence threshold.

Aspect 21: The method of Aspect 17, wherein determining the subset of sentences from the plurality of sentences to use for the text description of the media content includes: determining, using the machine learning model, a corresponding sentiment associated with each sentence of the plurality of sentences; comparing the corresponding sentiment associated with each sentence of the plurality of sentences to a sentiment associated with at least the portion of the media content; and determining the subset of sentences from the plurality of sentences that are within a sentiment threshold of the sentiment associated with at least the portion of the media content.

Aspect 22: The method of any of Aspects 1 to 21, wherein annotating the media content using the text description includes: generating an audio file using the text description of the media content.

Aspect 23: The method of Aspect 22, wherein generating the audio file includes converting the text description to an audio description, and further comprising embedding the audio file into a file of the media content.

Aspect 24: The method of any of Aspects 1 to 23, wherein the media content is live content.

Aspect 25: The method of any of Aspects 1 to 24, wherein the media content is pre-recorded content.

Aspect 26: The method of any of Aspects 1 to 25, wherein annotating the media content using the text description includes: generating a media summary of the media content using the text description of the media content.

Aspect 27: A system for annotating media content is provided that includes storage (e.g., a memory configured to store data, such as media data, one or more images, etc.) and one or more processors (e.g., implemented in circuitry) coupled to the memory. The one or more processors are configured to: obtain media content; generate, use one or more machine learning models, a metadata file for at least a portion of the media content, the metadata file including one or more metadata descriptions; generate a text description of the media content based on the one or more metadata descriptions of the metadata file; annotate the media content use the text description.

Aspect 28: The system of Aspect 27, wherein each metadata description of the one or more metadata descriptions is associated with at least one of a character depicted in at least the portion of the media content, a facial expression of the character depicted in at least the portion of the media content, an object depicted in at least the portion of the media content, and an action occurring in at least the portion of the media content.

Aspect 29: The system of Aspect 28, wherein the one or more processors are configured to: determine, use the one or more machine learning models, at least one of the character depicted in at least the portion of the media content, the facial expression of the character depicted in at least the portion of the media content, the object depicted in at least the portion of the media content, and the action occurring in at least the portion of the media content; generate the one or more metadata descriptions for at least one of the character depicted in at least the portion of the media content, the facial expression of the character depicted in at least the portion of the media content, the object depicted in at least the portion of the media content, and the action occurring in at least the portion of the media content.

Aspect 30: The system of Aspect 28, wherein the one or more processors are configured to: determine, use a first machine learning model, the character depicted in at least the portion of the media content; generate a first metadata description for the character depicted in at least the portion of the media content.

Aspect 31: The system of Aspect 28, wherein the one or more processors are configured to: determine, use a second machine learning model, the facial expression of the character depicted in at least the portion of the media content; generate a second metadata description for the facial expression of the character depicted in at least the portion of the media content.

Aspect 32: The system of Aspect 28, wherein the one or more processors are configured to: determine, use a third machine learning model, the object depicted in at least the portion of the media content and the action occurring in at least the portion of the media content; generate a third metadata description for the object depicted in at least the portion of the media content.

Aspect 33: The system of Aspect 28, wherein the one or more processors are configured to: generate a fourth metadata description for the action occurring in at least the portion of the media content.

Aspect 34: The system of Aspect 28, wherein the one or more processors are configured to: determine, use a fourth machine learning model, a path of the character depicted in at least the portion of the media content; generate a fifth metadata description for the path of the character.

Aspect 35: The system of Aspect 28, wherein the one or more processors are configured to: obtain audio associated with at least the portion of the media content; determine, use a fifth machine learning model, a sentiment associated with the audio; generate a sixth metadata description for the sentiment associated with the audio.

Aspect 36: The system of any of Aspects 27 to 35, wherein the one or more processors are configured to: determine, use a machine learning model, a first character and a second character depicted in at least the portion of the media content; determine a first priority score for the first character and a second priority score for the second character; add the first priority score and the second priority score to the metadata file.

Aspect 37: The system of Aspect 36, wherein the one or more processors are configured to: determine the first priority score is higher than the second priority score; based on determine the first priority score being higher than the second priority score, generate the text description of the media content use audio data associated with the first character.

Aspect 38: The system of any of Aspects 27 to 37, wherein the portion of the media content includes a particular duration of the media content.

Aspect 39: The system of Aspect 38, wherein the particular duration of the media content includes a segment of the media content.

Aspect 40: The system of any of Aspects 27 to 39, wherein the one or more processors are configured to: associate each metadata description of the one or more metadata descriptions with a correspond timestamp within the media content.

Aspect 41: The system of any of Aspects 27 to 40, wherein the one or more processors are configured to: generate one or more metadata files for a plurality of portions of the media content, each metadata file of the one or more metadata files be associated with a correspond timestamp within the media content.

Aspect 42: The system of Aspect 41, wherein each portion of the plurality of portions of the media content includes a corresponding particular duration of the media content.

Aspect 43: The system of any of Aspects 27 to 42, wherein the one or more processors are configured to: generate a plurality of sentences using the one or more metadata descriptions; determine, use a machine learning model, a subset of sentences from the plurality of sentences to use for the text description of the media content.

Aspect 44: The system of any of Aspects 27 to 43, wherein the one or more processors are configured to: determine a subset of metadata descriptions from the one or more metadata descriptions having confidence scores greater than a confidence threshold; generate the plurality of sentences use the subset of metadata descriptions having confidence scores greater than the confidence threshold.

Aspect 45: The system of Aspect 44, wherein the one or more processors are configured to: discard one or more metadata descriptions from the one or more metadata descriptions having a confidence score greater than the confidence threshold.

Aspect 46: The system of Aspect 44, wherein the one or more processors are configured to: obtain a plurality of template sentences, each template sentence of the plurality of template sentences including one or more placeholder metadata tags; replace placeholder metadata tags of the plurality of template sentences with the subset of metadata descriptions having confidence scores greater than the confidence threshold.

Aspect 47: The system of Aspect 43, wherein the one or more processors are configured to: determine, use the machine learning model, a correspond sentiment associated with each sentence of the plurality of sentences; compare the corresponding sentiment associated with each sentence of the plurality of sentences to a sentiment associated with at least the portion of the media content; determine the subset of sentences from the plurality of sentences that are within a sentiment threshold of the sentiment associated with at least the portion of the media content.

Aspect 48: The system of any of Aspects 27 to 47, wherein the one or more processors are configured to: generate an audio file use the text description of the media content.

Aspect 49: The system of Aspect 48, wherein generating the audio file includes converting the text description to an audio description, and further comprising embedding the audio file into a file of the media content.

Aspect 50: The system of any of Aspects 27 to 49, wherein the media content is live content.

Aspect 51: The system of any of Aspects 27 to 50, wherein the media content is pre-recorded content.

Aspect 52: The system of any of Aspects 27 to 51, wherein the one or more processors are configured to: generate a media summary of the media content use the text description of the media content.

Aspect 53: A non-transitory computer-readable medium having stored thereon instructions that, when executed by one or more processors, cause the one or more processors to: obtain media content; generate, use one or more machine learning models, a metadata file for at least a portion of the media content, the metadata file including one or more metadata descriptions; generate a text description of the media content based on the one or more metadata descriptions of the metadata file; annotate the media content use the text description.

Aspect 54: The non-transitory computer-readable medium of Aspect 53, wherein each metadata description of the one or more metadata descriptions is associated with at least one of a character depicted in at least the portion of the media content, a facial expression of the character depicted in at least the portion of the media content, an object depicted in at least the portion of the media content, and an action occurring in at least the portion of the media content.

Aspect 55: The non-transitory computer-readable medium of Aspect 54, further comprising instructions that, when executed by the one or more processors, cause the one or more processors to: determine, use the one or more machine learning models, at least one of the character depicted in at least the portion of the media content, the facial expression of the character depicted in at least the portion of the media content, the object depicted in at least the portion of the media content, and the action occurring in at least the portion of the media content; generate the one or more metadata descriptions for at least one of the character depicted in at least the portion of the media content, the facial expression of the character depicted in at least the portion of the media content, the object depicted in at least the portion of the media content, and the action occurring in at least the portion of the media content.

Aspect 56: The non-transitory computer-readable medium of Aspect 54, further comprising instructions that, when executed by the one or more processors, cause the one or more processors to: determine, use a first machine learning model, the character depicted in at least the portion of the media content; generate a first metadata description for the character depicted in at least the portion of the media content.

Aspect 57: The non-transitory computer-readable medium of Aspect 54, further comprising instructions that, when executed by the one or more processors, cause the one or more processors to: determine, use a second machine learning model, the facial expression of the character depicted in at least the portion of the media content; generate a second metadata description for the facial expression of the character depicted in at least the portion of the media content.

Aspect 58: The non-transitory computer-readable medium of Aspect 54, further comprising instructions that, when executed by the one or more processors, cause the one or more processors to: determine, use a third machine learning model, the object depicted in at least the portion of the media content and the action occurring in at least the portion of the media content; generate a third metadata description for the object depicted in at least the portion of the media content.

Aspect 59: The non-transitory computer-readable medium of Aspect 54, further comprising instructions that, when executed by the one or more processors, cause the one or more processors to: generate a fourth metadata description for the action occurring in at least the portion of the media content.

Aspect 60: The non-transitory computer-readable medium of Aspect 54, further comprising instructions that, when executed by the one or more processors, cause the one or more processors to: determine, use a fourth machine learning model, a path of the character depicted in at least the portion of the media content; generate a fifth metadata description for the path of the character.

Aspect 61: The non-transitory computer-readable medium of Aspect 54, further comprising instructions that, when executed by the one or more processors, cause the one or more processors to: obtain audio associated with at least the portion of the media content; determine, use a fifth machine learning model, a sentiment associated with the audio; generate a sixth metadata description for the sentiment associated with the audio.

Aspect 62: The non-transitory computer-readable medium of any of Aspects 53 to 61, further comprising instructions that, when executed by the one or more processors, cause the one or more processors to: determine, use a machine learning model, a first character and a second character depicted in at least the portion of the media content; determine a first priority score for the first character and a second priority score for the second character; add the first priority score and the second priority score to the metadata file.

Aspect 63: The non-transitory computer-readable medium of Aspect 62, further comprising instructions that, when executed by the one or more processors, cause the one or more processors to: determine the first priority score is higher than the second priority score; based on determine the first priority score being higher than the second priority score, generate the text description of the media content use audio data associated with the first character.

Aspect 64: The non-transitory computer-readable medium of any of Aspects 53 to 63, wherein the portion of the media content includes a particular duration of the media content.

Aspect 65: The computer readable medium of Aspect 64, wherein the particular duration of the media content includes a segment of the media content.

Aspect 66: The non-transitory computer-readable medium of any of Aspects 53 to 65, further comprising instructions that, when executed by the one or more processors, cause the one or more processors to: associate each metadata description of the one or more metadata descriptions with a correspond timestamp within the media content.

Aspect 67: The non-transitory computer-readable medium of any of Aspects 53 to 66, further comprising instructions that, when executed by the one or more processors, cause the one or more processors to: generate one or more metadata files for a plurality of portions of the media content, each metadata file of the one or more metadata files be associated with a correspond timestamp within the media content.

Aspect 68: The non-transitory computer-readable medium of Aspect 67, wherein each portion of the plurality of portions of the media content includes a corresponding particular duration of the media content.

Aspect 69: The non-transitory computer-readable medium of any of Aspects 53 to 68, further comprising instructions that, when executed by the one or more processors, cause the one or more processors to: generate a plurality of sentences using the one or more metadata descriptions; determine, use a machine learning model, a subset of sentences from the plurality of sentences to use for the text description of the media content.

Aspect 70: The non-transitory computer-readable medium of any of Aspects 53 to 69, further comprising instructions that, when executed by the one or more processors, cause the one or more processors to: determine a subset of metadata descriptions from the one or more metadata descriptions having confidence scores greater than a confidence threshold; generate the plurality of sentences use the subset of metadata descriptions having confidence scores greater than the confidence threshold.

Aspect 71: The non-transitory computer-readable medium of Aspect 70, further comprising instructions that, when executed by the one or more processors, cause the one or more processors to: discard one or more metadata descriptions from the one or more metadata descriptions having a confidence score greater than the confidence threshold.

Aspect 72: The non-transitory computer-readable medium of Aspect 70, further comprising instructions that, when executed by the one or more processors, cause the one or more processors to: obtain a plurality of template sentences, each template sentence of the plurality of template sentences including one or more placeholder metadata tags; replace placeholder metadata tags of the plurality of template sentences with the subset of metadata descriptions having confidence scores greater than the confidence threshold.

Aspect 73: The non-transitory computer-readable medium of Aspect 69, further comprising instructions that, when executed by the one or more processors, cause the one or more processors to: determine, use the machine learning model, a correspond sentiment associated with each sentence of the plurality of sentences; compare the corresponding sentiment associated with each sentence of the plurality of sentences to a sentiment associated with at least the portion of the media content; determine the subset of sentences from the plurality of sentences that are within a sentiment threshold of the sentiment associated with at least the portion of the media content.

Aspect 74: The non-transitory computer-readable medium of any of Aspects 53 to 73, further comprising instructions that, when executed by the one or more processors, cause the one or more processors to: generate an audio file use the text description of the media content.

Aspect 75: The non-transitory computer-readable medium of Aspect 74, wherein generating the audio file includes converting the text description to an audio description, and further comprising embedding the audio file into a file of the media content.

Aspect 76: The non-transitory computer-readable medium of any of Aspects 53 to 75, wherein the media content is live content.

Aspect 77: The non-transitory computer-readable medium of any of Aspects 53 to 76, wherein the media content is pre-recorded content.

Aspect 78: The non-transitory computer-readable medium of any of Aspects 53 to 77, further comprising instructions that, when executed by the one or more processors, cause the one or more processors to: generate a media summary of the media content use the text description of the media content.

What is claimed is:

1. A method of annotating media content, the method comprising:
   obtaining media content;
   generating, using one or more machine learning models, a metadata file for at least a portion of the media content, the metadata file including one or more metadata descriptions;
   generating a plurality of sentences using the one or more metadata descriptions;
   determining, using a machine learning model, a corresponding sentiment associated with each sentence of the plurality of sentences;
   comparing the corresponding sentiment associated with each sentence of the plurality of sentences to a sentiment associated with at least the portion of the media content;
   determining a subset of sentences from among the plurality of sentences to generate a text description of a scene, wherein the subset of sentences are within a sentiment threshold of the sentiment associated with at least the portion of the media content; and
   annotating the media content using the text description of the scene of the media content.

2. The method of claim 1, wherein each metadata description of the one or more metadata descriptions is associated with at least one of a character depicted in at least the portion of the media content, a facial expression of the character depicted in at least the portion of the media content, an object depicted in at least the portion of the media content, and an action occurring in at least the portion of the media content.

3. The method of claim 2, wherein generating the metadata file for at least the portion of the media content includes:
   determining, using the one or more machine learning models, at least one of the character depicted in at least the portion of the media content, the facial expression of the character depicted in at least the portion of the media content, the object depicted in at least the portion of the media content, and the action occurring in at least the portion of the media content; and
   generating the one or more metadata descriptions for at least one of the character depicted in at least the portion of the media content, the facial expression of the character depicted in at least the portion of the media content, the object depicted in at least the portion of the media content, and the action occurring in at least the portion of the media content.

4. The method of claim 1, further comprising:
   determining, using a machine learning model, a first character and a second character depicted in at least the portion of the media content;
   determining a first priority score for the first character and a second priority score for the second character; and
   adding the first priority score and the second priority score to the metadata file.

5. The method of claim 4, further comprising:
   determining the first priority score is higher than the second priority score; and
   based on determining the first priority score being higher than the second priority score, generating the text description of the scene of the media content using audio data associated with the first character.

6. The method of claim 1, further comprising:
   generating one or more metadata files for a plurality of portions of the media content, each metadata file of the one or more metadata files being associated with a corresponding timestamp within the media content.

7. The method of claim 1, wherein generating the plurality of sentences using the one or more metadata descriptions includes:
   determining a subset of metadata descriptions from the one or more metadata descriptions having confidence scores greater than a confidence threshold; and
   generating the plurality of sentences using the subset of metadata descriptions having confidence scores greater than the confidence threshold.

8. The method of claim 7, further comprising:
   discarding one or more metadata descriptions from the one or more metadata descriptions having a confidence score greater than the confidence threshold.

9. The method of claim 7, wherein generating the plurality of sentences using the subset of metadata descriptions includes:
   obtaining a plurality of template sentences, each template sentence of the plurality of template sentences including one or more placeholder metadata tags; and
   replacing placeholder metadata tags of the plurality of template sentences with the subset of metadata descriptions having confidence scores greater than the confidence threshold.

10. The method of claim 1, wherein annotating the media content using the text description of the scene of the media content includes:
    generating an audio file using the text description.

11. The method of claim 10, wherein generating the audio file includes converting the text description to an audio description, and further comprising embedding the audio file into a file of the media content.

12. The method of claim 1, wherein annotating the media content using the text description of the scene of the media content includes:
    generating a media summary of the media content using the text description.

13. A system for annotating media content, including:
    a memory; and
    one or more processors coupled to the memory and configured to:
       obtain media content;
       generate, using one or more machine learning models, a metadata file for at least a portion of the media content, the metadata file including one or more metadata descriptions;
       generate a plurality of sentences using the one or more metadata descriptions;
       determine, using a machine learning model, a corresponding sentiment associated with each sentence of the plurality of sentences;
       compare the corresponding sentiment associated with each sentence of the plurality of sentences to a sentiment associated with at least the portion of the media content;
       determining a subset of sentences from among the plurality of sentences to generate a text description of a scene, wherein the subset of sentences are within a sentiment threshold of the sentiment associated with at least the portion of the media content; and
       annotate the media content use the text description of the scene of the media content.

14. The system of claim 13, wherein each metadata description of the one or more metadata descriptions is associated with at least one of a character depicted in at least the portion of the media content, a facial expression of the character depicted in at least the portion of the media content, an object depicted in at least the portion of the media content, and an action occurring in at least the portion of the media content.

15. The system of claim 14, wherein the one or more processors are configured to:
    determine, use the one or more machine learning models, at least one of the character depicted in at least the portion of the media content, the facial expression of the character depicted in at least the portion of the media content, the object depicted in at least the portion of the media content, and the action occurring in at least the portion of the media content; and
    generate the one or more metadata descriptions for at least one of the character depicted in at least the portion of the media content, the facial expression of the character depicted in at least the portion of the media content, the object depicted in at least the portion of the media content, and the action occurring in at least the portion of the media content.

16. The system of claim 13, wherein the one or more processors are configured to:
    determine, use a machine learning model, a first character and a second character depicted in at least the portion of the media content;
    determine a first priority score for the first character and a second priority score for the second character; and
    add the first priority score and the second priority score to the metadata file.

17. The system of claim 16, wherein the one or more processors are configured to:
    determine the first priority score is higher than the second priority score; and
    based on determining the first priority score is higher than the second priority score, generate the text description of the scene of the media content using audio data associated with the first character.

18. A non-transitory computer-readable storage medium having stored thereon instructions that, when executed by at least one processor, cause the at least one processor to:
    obtain media content;
    generate, using one or more machine learning models, a metadata file for at least a portion of the media content, the metadata file including one or more metadata descriptions;
    generate a plurality of sentences using the one or more metadata descriptions;
    determine, using a machine learning model, a subset of sentences from the plurality of sentences to generate a text description of a scene of the media content; and
    annotate the media content use the text description of the scene of the media content.

19. The non-transitory computer-readable storage medium of claim 18, wherein each metadata description of the one or more metadata descriptions is associated with at least one of a character depicted in at least the portion of the media content, a facial expression of the character depicted in at least the portion of the media content, an object depicted in at least the portion of the media content, and an action occurring in at least the portion of the media content.

\* \* \* \* \*